United States Patent
Fiala

(10) Patent No.: US 11,100,649 B2
(45) Date of Patent: Aug. 24, 2021

(54) FIDUCIAL MARKER PATTERNS, THEIR AUTOMATIC DETECTION IN IMAGES, AND APPLICATIONS THEREOF

(71) Applicant: Millennium Three Technologies, Inc., Edmonton (CA)

(72) Inventor: Mark Fiala, Edmonton (CA)

(73) Assignee: Millennium Three Technologies, Inc.

(*) Notice: Subject to any disclaimer, the term of this patent is extended or adjusted under 35 U.S.C. 154(b) by 0 days.

(21) Appl. No.: 16/787,546

(22) Filed: Feb. 11, 2020

(65) Prior Publication Data

US 2020/0211198 A1 Jul. 2, 2020

Related U.S. Application Data

(60) Continuation of application No. 16/694,387, filed on Nov. 25, 2019, now Pat. No. 10,929,980, which is a
(Continued)

(51) Int. Cl.
*G06T 7/13* (2017.01)
*G06T 7/246* (2017.01)
(Continued)

(52) U.S. Cl.
CPC ............... *G06T 7/13* (2017.01); *A63F 13/213* (2014.09); *A63F 13/25* (2014.09); *A63F 13/65* (2014.09);
(Continued)

(58) Field of Classification Search
CPC . G06T 7/246; G06T 7/13; G06T 2207/20076; A63F 13/213; A63F 13/25; A63F 13/65; A63F 2300/8076; G02B 27/0172; G02B 2027/0138; G02B 2027/014; G06F 17/5009; G06F 9/00671; G05B 2219/32404
(Continued)

(56) References Cited

U.S. PATENT DOCUMENTS 7,769,236 B2  8/2010  Fiala
8,645,220 B2  2/2014  Harper et al.
(Continued)

FOREIGN PATENT DOCUMENTS

KR  20120074668 A  7/2012
WO     0124536 A2  4/2001

OTHER PUBLICATIONS

D. Claus and Fitzgibbon. Reliable fiducial detection in natural scenes. In Proceedings of the 8th European Conference on Computer Vision, Prague, Czech Republic, May 2004.
(Continued)

*Primary Examiner* — Ali Bayat
(74) *Attorney, Agent, or Firm* — Frank M. Scutch, III

(57) ABSTRACT

Fiducial markers are printed patterns detected by algorithms in imagery from image sensors for applications such as automated processes and augmented reality graphics. The present invention sets forth extensions and improvements to detection technology to achieve improved performance, and discloses applications of fiducial markers including multi-camera systems, remote control devices, augmented reality applications for mobile devices, helmet tracking, and weather stations.

17 Claims, 25 Drawing Sheets

Related U.S. Application Data division of application No. 15/312,657, filed as application No. PCT/CA2015/000329 on May 21, 2015, now Pat. No. 10,504,231.

(60) Provisional application No. 62/043,412, filed on Aug. 29, 2014, provisional application No. 62/001,071, filed on May 21, 2014.

(51) Int. Cl.

| | | |
|---|---|---|
| A63F 13/65 | (2014.01) | |
| A63F 13/213 | (2014.01) | |
| G02B 27/01 | (2006.01) | |
| G02B 27/00 | (2006.01) | |
| G06T 7/277 | (2017.01) | |
| G06T 7/73 | (2017.01) | |
| G06F 30/20 | (2020.01) | |
| A63F 13/25 | (2014.01) | |
| G06K 9/00 | (2006.01) | |
| G06F 30/00 | (2020.01) | |

(52) U.S. Cl.
CPC ....... *G02B 27/0093* (2013.01); *G02B 27/017* (2013.01); *G02B 27/0172* (2013.01); *G06F 30/20* (2020.01); *G06K 9/00671* (2013.01); *G06T 7/246* (2017.01); *G06T 7/277* (2017.01); *G06T 7/75* (2017.01); *A63F 2300/8076* (2013.01); *G02B 2027/014* (2013.01); *G02B 2027/0138* (2013.01); *G02B 2027/0187* (2013.01); *G06F 30/00* (2020.01); *G06T 2207/20076* (2013.01); *G06T 2207/30204* (2013.01); *G06T 2207/30208* (2013.01)

(58) Field of Classification Search
USPC ........................................................ 382/173
See application file for complete search history.

(56) References Cited

U.S. PATENT DOCUMENTS

| | | | |
|---|---|---|---|
| 2002/0000995 A1* | 1/2002 | Sawada | ................. G09G 1/165 345/620 |
| 2004/0104935 A1 | 6/2004 | Williamson et al. | |
| 2005/0289590 A1 | 12/2005 | Cheok et al. | |
| 2011/0280453 A1* | 11/2011 | Chen | ....................... G06T 7/75 382/113 |
| 2012/0069131 A1* | 3/2012 | Abelow | ............... G06Q 10/067 348/14.01 |
| 2013/0135344 A1 | 5/2013 | Stirbu et al. | |
| 2013/0346302 A1* | 12/2013 | Purves | ................ G06Q 20/108 705/40 |
| 2014/0052617 A1* | 2/2014 | Chawla | ................ G06Q 20/102 705/39 |
| 2014/0119593 A1 | 5/2014 | Filler | |
| 2014/0168262 A1 | 6/2014 | Forutanpour et al. | |
| 2017/0354468 A1* | 12/2017 | Johnson | ................... B25J 5/007 |
| 2019/0269467 A1* | 9/2019 | Forsyth | ................. A61B 34/30 |

OTHER PUBLICATIONS

L. Naimark and E. Foxlin. Circular data matrix fiducial system and robust image processing for a wearable vision-inertial self-tracker. In ISMAR 2002: IEEE / ACM International Symposium on Mixed and Augmented Reality, Darmstadt,Germany, Sep. 2002.

H. Kato and M. Billinghurst; Marker tracking and hmd calibration for a video-based augmented reality conferencing system. In Proc. the 2nd IEEE and ACM International Workshop on Augmented Reality, pp. 85-94, San Francisco, CA, USA, Oct. 1999.

V. Knyaz and A. Sibiryakov; The development of new coded targets for automated point identification and non-contact 3d surface measurements. In Graphicon, Moscow, Russia, 1998.

F. Xiao C. Owen and P. Middlin; What is the best fiducial? In First IEEE International Augmented Reality Toolkit Workshop (at ISMAR), Sep. 2002.

Ross Bencina, Martin Kaltenbrunner and Sergi Jord'a; Improved Topological Fiducial Tracking in the reacTIVision System, CVPR 2005 (reactivision_cvpr2005.pdf).

Mark Fiala, Dave Green; A Panoramic Video and Acoustic Beamforming Sensor for Videoconferencing. HAVE 2004 (IEEE Intl. Workshop on Haptic Audio Visual Environments and their Applications), Oct. 2004.

\* cited by examiner

Correct Perspective    Incorrect Perspective
Virtual chess pieces added to empty chess board.

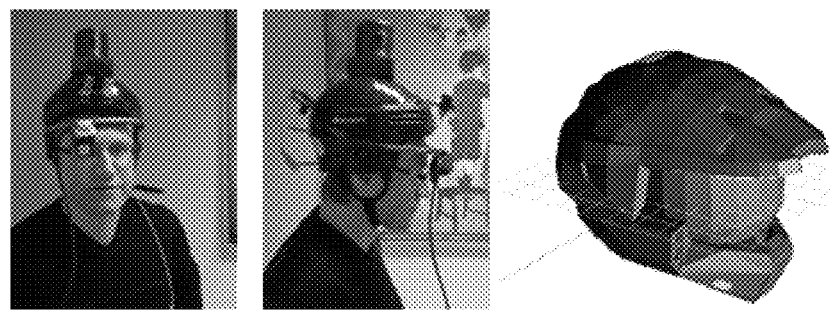
Figure 17
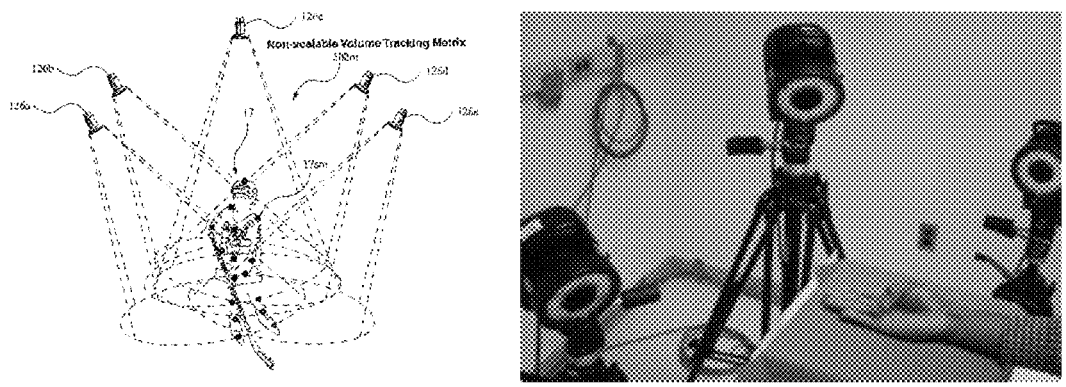
Figure 18
$$u = \frac{f_x x_c}{z_c} + u_0, \quad v = \frac{f_y y_c}{z_c} + v_0$$
$$\begin{bmatrix} u' \\ v' \\ w' \end{bmatrix} = K \begin{bmatrix} x_c \\ y_c \\ z_c \end{bmatrix} \quad \begin{bmatrix} u' \\ v' \\ w' \end{bmatrix} = \begin{bmatrix} f_x & 0 & u_0 \\ 0 & f_y & v_0 \\ 0 & 0 & 1 \end{bmatrix} \begin{bmatrix} x_c \\ y_c \\ z_c \end{bmatrix} \quad \begin{matrix} u = \frac{u'}{w'} \\ \\ v = \frac{v'}{w'} \end{matrix}$$
Figure 19

$$\begin{bmatrix} i \\ j \\ 1 \end{bmatrix} = K^{-1} \begin{bmatrix} u \\ v \\ 1 \end{bmatrix} \qquad \begin{bmatrix} i' \\ j' \\ k' \end{bmatrix} = R \begin{bmatrix} X_W - T_X \\ Y_W - T_Y \\ Z_W - T_Z \end{bmatrix} \qquad \begin{bmatrix} i' \\ j' \\ k' \\ 1 \end{bmatrix} = \overbrace{\begin{bmatrix} P_{11} & P_{12} & P_{13} & P_{14} \\ P_{21} & P_{22} & P_{23} & P_{24} \\ P_{31} & P_{32} & P_{33} & P_{34} \\ 0 & 0 & 0 & 1 \end{bmatrix}}^{Projection\ matrix} \begin{bmatrix} X_W \\ Y_W \\ Z_W \\ 1 \end{bmatrix}$$

$$i = \frac{i'}{k'} \qquad j = \frac{j'}{k'}$$

Figure 20

Assume P34=1 for AX=B form $$P_{31} i X_w + P_{32} i Y_w + P_{33} i Z_w - P_{11} X_w - P_{12} Y_w - P_{13} Z_w - P_{14} = -i$$
$$P_{31} j X_w + P_{32} j Y_w + P_{33} j Z_w - P_{21} X_w - P_{22} Y_w - P_{23} Z_w - P_{24} = -j$$

AX=0 form $$P_{31} i X_w + P_{32} i Y_w + P_{33} i Z_w + P_{34} i - P_{11} X_w - P_{12} Y_w - P_{13} Z_w - P_{14} = 0$$
$$P_{31} j X_w + P_{32} j Y_w + P_{33} j Z_w + P_{34} j - P_{21} X_w - P_{22} Y_w - P_{23} Z_w - P_{24} = 0$$

Figure 21

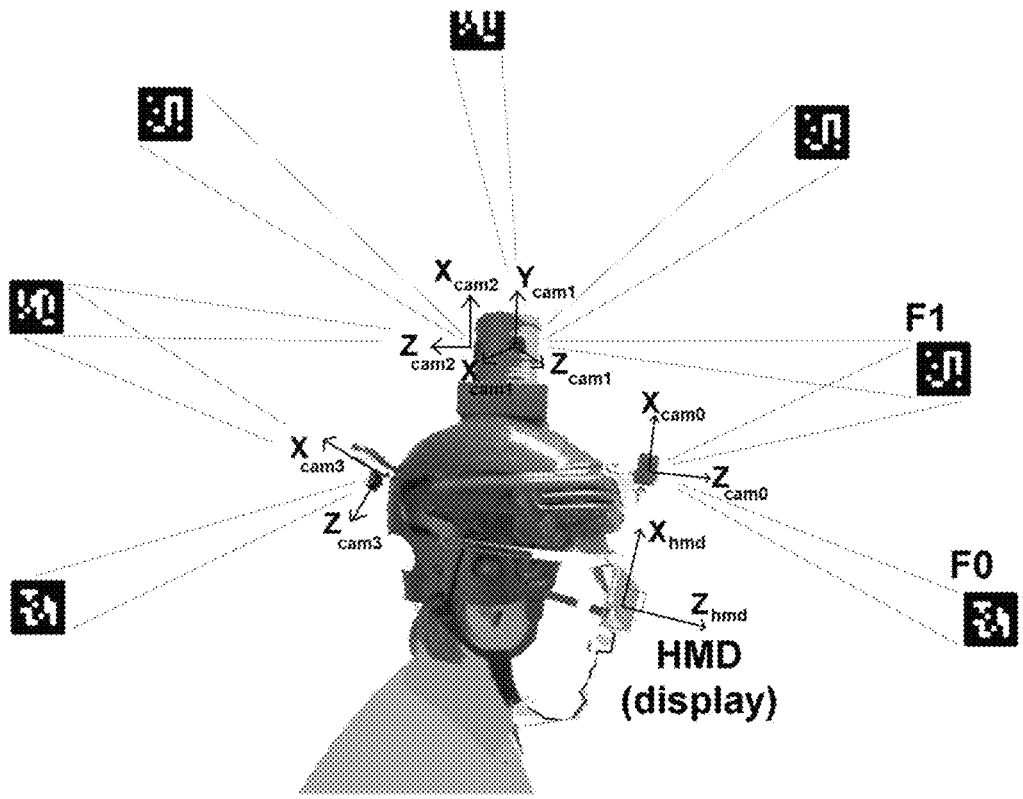

Figure 22

$$\begin{bmatrix} i_{cam0}' \\ j_{cam0}' \\ k_{cam0}' \\ 1 \end{bmatrix} = \overbrace{\begin{bmatrix} P_{11} & P_{12} & P_{13} & P_{14} \\ P_{21} & P_{22} & P_{23} & P_{24} \\ P_{31} & P_{32} & P_{33} & P_{34} \\ 0 & 0 & 0 & 1 \end{bmatrix}}^{\text{Projection matrix}} \begin{bmatrix} R_{cam0_{11}} & R_{cam0_{12}} & R_{cam0_{13}} & T_{x\,cam0} \\ R_{cam0_{21}} & R_{cam0_{22}} & R_{cam0_{23}} & T_{y\,cam0} \\ R_{cam0_{31}} & R_{cam0_{32}} & R_{cam0_{33}} & T_{z\,cam0} \\ 0 & 0 & 0 & 1 \end{bmatrix} \begin{bmatrix} X_w \\ Y_w \\ Z_w \\ 1 \end{bmatrix}$$

Figure 23

$$\begin{bmatrix} X_{hmd} \\ Y_{hmd} \\ Z_{hmd} \\ 1 \end{bmatrix} = \begin{bmatrix} R_{cam0_{11}} & R_{cam0_{12}} & R_{cam0_{13}} & T_{x\,cam0} \\ R_{cam0_{21}} & R_{cam0_{22}} & R_{cam0_{23}} & T_{y\,cam0} \\ R_{cam0_{31}} & R_{cam0_{32}} & R_{cam0_{33}} & T_{z\,cam0} \\ 0 & 0 & 0 & 1 \end{bmatrix} \begin{bmatrix} X_w \\ Y_w \\ Z_w \\ 1 \end{bmatrix}$$

Figure 24

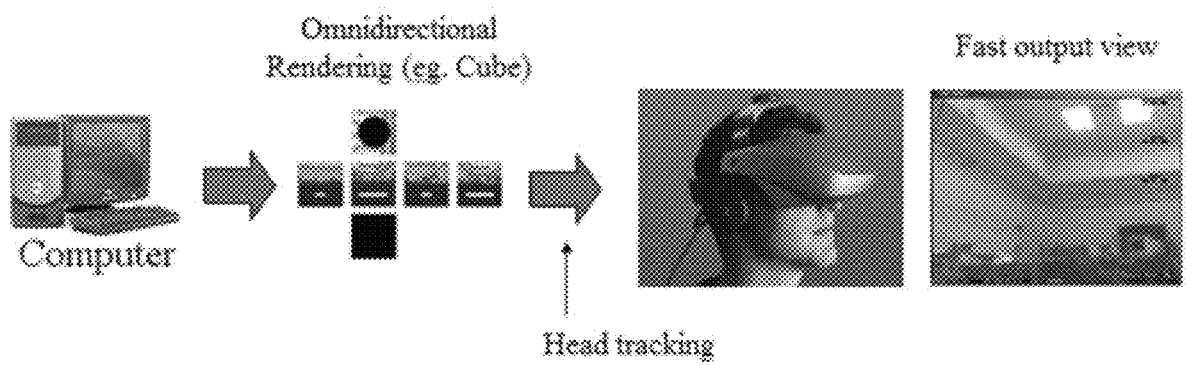

Figure 25 three graphical overlays associated to markers (shown in white)

0 M    10 M    50 M    250 M

FIDUCIAL MARKER PATTERNS, THEIR AUTOMATIC DETECTION IN IMAGES, AND APPLICATIONS THEREOF

TECHNICAL FIELD

The present invention sets forth improvements of fiducial marker detection technology to achieve enhanced performance, and teaches applications of fiducial markers including multi-camera systems, remote control devices, augmented reality applications for mobile devices, helmet tracking, and weather stations.

BACKGROUND OF THE INVENTION

Marker patterns can be added to objects or scenes to allow automatic systems to find correspondence between points in the world and points in camera images, and to find correspondences between points in one camera image and points in another camera image. The former has application in positioning, robotics, and augmented reality applications, the latter has application in automatic computer modeling to provide the coordinates of world points for applications of the former. Furthermore, marker patterns can be used to contain information relating to various products. For example, marker patterns printed out and mounted on a piece of equipment would allow an augmented reality system to aid a person constructing or servicing this equipment by overlaying virtual graphics with instructions over their view (known as "Augmented Reality"), with the aid of an image sensor (light capturing device such as camera, video camera, digital camera, etc) and the computer vision techniques that locate these patterns. Furthermore with camera cell phones and PDAs becoming commonly available, a marker could be used to link a user to an URL address providing access to a series of images, advertisement etc. Another example of use includes a robot which could navigate by detecting markers placed in its environment. Using computer vision, cameras and cameras cell phones to determine relative pose is an inexpensive and accurate approach useful to many domains.

Measurements such as position and orientation of objects, sensing of industrial and weather values, are possible with "smart cameras" which are system combinations of image sensing and processing, and with consumer mobile devices such as mobile phones, tablets, and wearable technology. Measurements such as position and orientation are useful for the above mentioned augmented reality applications. Many measurements require the identification of points in the environment, thus the creation of a list of correspondences between object points within an image and points in the environment are needed. Fiducial marker systems help address this, they are a combination of special printed patterns, some image sensor, and the algorithms to process the images from the image sensor to find the presence, and image location, of these fiducial markers. This distinguishes marker detection from other "marker-less" computer vision. It is not inconvenient in many applications to mount markers on objects or locations, indeed it is sometimes necessary to be able to use imagery from similar or identical objects such as warehouse boxes, or un-textured objects such as blank walls. Reliable and high speed detection of fiducial markers is not a trivial task.

U.S. Pat. No. 7,769,236 B2 (referred to herein as the "Main Detection Algorithm") describes a marker comprising a polygonal border having at least four non collinear salient points, the interior of this pattern containing a binary digital code. The "Main Detection Algorithm" teaches the steps of detecting an image, using an edge detector to detect an edge in said image, grouping more than one edge into a line segments, and grouping these segments into polygons, and searching the polygon interiors to select the polygons which are images of markers in the scene imaged by a camera. The "Main Detection Algorithm" operates on each image independently with no history of past images. U.S. Pat. No. 7,769,236 B2 is incorporated herein by reference.

FIG. 1 shows the "Main Detection Algorithm" from U.S. Pat. No. 7,769,236 B2. This drawing illustrates processing stages for finding a marker in a single image, with no a priori information.

FIG. 2 shows more details of the "detect polygons using edge-based method" stage of the "Main Detection Algorithm" depicted in FIG. 1. From left to right, top to bottom: Stage A shows the original image, edges are found in the image and joined together to form line segments, which in turn are joined in Stage B to form candidate quadrilaterals, each candidate quadrilateral is then examined in Stage C for an internal valid digital code to produce a final output set of detected markers. This process is repeated for each input image frame. This does not take advantage of the similarity between consecutive image frames in video input.

SUMMARY OF THE INVENTION

The present invention is related to computer vision where the image is captured by a light sensing array, such as a video camera or image sensor found in a hand-held tablet or wearable device. Algorithms implemented in software, hardware, or some combination of software and hardware can provide sensing and identification capabilities. Computer vision allows a digital image or video stream to be used as a sensor input. The present invention involves a complementary pair of patterns and algorithms to detect them. This allows fully automatic processes such as camera calibration, robot navigation and spacecraft/satellite docking as well as special hand-held remote controls, as well as graphical interfaces for hand-held and wearable augmented reality and virtual reality where users see computer generated content that is associated, or appears to belong, along with the real environment. Applications of augmented reality involve advertising appearing from printed media using a smartphone, video gaming where people move around a space with their bodies and perceive virtual content that appears to be around them, and industrial interfaces where factory staff can interact with machines, valves, sensors, etc from a distance.

With the present invention a user uses a special remote control or views a real scene with a mobile device such as a phone or tablet, through a wearable device, or standard computer and sees overlaid information over top of relevant objects in their environment identified by placing "fiducial markers" on top of them. Information can be seen by the user, and the user can interact with it to change computer data or affect hardware control. For example, markers can be placed next to light switches and move around while seeing virtual computer information, thus providing the illusion of the user co-existing in the computer world.

Another aspect of the present invention relates to a Multi-Camera Array application for use in "AR/VR" helmets, which pertains to wearable augmented reality and virtual reality where users can move around a space (such as a room, or entire building) and see computer generated content drawn in a wearable display that provides the illusion of presence. This is towards the science fiction notion of a "holodeck". More specifically the present invention relates to an improved position and orientation tracking system that is contained within a wearable helmet like device, as well as the overall system architecture of a display, this novel tracking system, and optional graphics hardware and an optional wireless connection. A typical application is mobile video gaming or interactive design and visualization of 3D data.

The Multi-Camera Array application for use in high lighting dynamic range situations is useful in fields such as space operations. Current image sensors have a limited dynamic range of intensity, there is a relatively small range between the minimal detected lower level and maximal detected high level of light intensity. This range for image sensors, especially those economical to use in commercial or industrial systems, is less than the dynamic range for intensity of the human eye, for example. Humans can see features in a dark part of a scene at the same time as features in a bright area of the same scene, whereas when viewing with a video camera or mobile device image sensor only one or the other can be seen, depending on the iris setting which limits the light entering the sensor. Photographers typically have to decide between capturing the light or dark parts of a scene. Attempts to improve this involve "High Dynamic Range" (HDR) imagery which typically combines several images with different exposures, an approach not useful for scenes with motion between these different exposures. This problem affects situations where fiducial markers would be useful but there are wide ranges in light intensity, such as in outer space for docking spacecraft or within an industrial site such as metal forging.

The present invention's applications are related to remote control and remote access to information. Information and control functionality is increasingly being implemented by computerized systems, the present invention discloses a method for intuitive and convenient control of systems and observation of data collected or stored by a computer. The control of systems and information is becoming increasingly "disembodied" from the relevant world objects. For example, a light switch is not next to a room light but on a wall elsewhere. In factories machines are their sensors are wired to a control room where one has to be to control or view the sensory information. The present invention can be considered part of a movement to bring a psychological link back to real world objects, so that information and control is close to the relevant object.

Another field of application is logistical and industrial applications such as locating objects within a warehouse or seeing real time control SCADA (Supervisory Control and Data Acquisition) information for industrial plants or refineries. The user of marker detection algorithms (MDAs) along with web browsers, remote image capture, and sending collaborative information for remote guided maintenance between two workers is disclosed.

Quickly creating and deploying graphical content for AR is a current problem, disclosed herein is an approach using web-browser combined with MDAs technology to address this. AR systems are still an emerging technology and the content shown and computer programming for interaction is typically custom made for the application. Workers trained in the use of the proprietary software then must customize for changes and new content, often with constant maintenance by the original software architects. Using the existing world wide web software and interfaces leverages existing standards and accesses a wide group of content developers familiar with html, who can quickly look at their design in a normal web browser on their computer. Also, automatic attractive content can be created from a template, for example in a building each light switch will have a different name but all light switches can share the same graphical design.

In another aspect of the present invention, there is provided a convenient solution in situations where data about a physical object or location of interest is on this computer screen but not at the physical site of the object or location. This invention discloses a method for easily creating and deploying graphics for remote monitoring of computerized information using "augmented reality" (AR) applications. Fiducial markers as two dimensional patterns are placed in the environment and are detected by the image sensor on a mobile device. It is often difficult or undesirable to conveniently and safely obtain some data directly to display on the mobile device, and the information is often already graphically depicted and displayed on the computer screen. This invention uses the capture of the imagery on the computer screen and display of this imagery on the mobile device by associating the imagery with a specific fiducial marker. When the mobile device detects a marker, it accesses a list matching marker ID with the imagery source and displays this imagery on the mobile device. For example, one implementation is where several rectangular sections of a control screen in an industrial site can be constantly captured by a program running on the computer, with each image section stored on a server associated with a given marker ID, so that when the user is not in the control room with this main computer, but aims their mobile device at objects or places in their industrial facility, upon each of which a marker with a unique ID is affixed, and sees this image section drawn over top of the live video image on the mobile device's screen. In this way, live access to control room data can be gained when a user is not in the control room, without needing to interface to the facility's communications directly.

An important metric for weather forecasting, mountaineering, wind tunnels, and underwater work is the "visibility distance"; the distance to which visible light can effectively travel. This typically requires a human being to estimate this distance. The present invention also discloses a method by which a "smart camera" automated system could determine this automatically and optionally relay this information back to some headquarters of a weather office, for example. Fiducial markers detected by the said algorithms can provide a reliable binary result of whether a marker was visible or not. By placing markers at different distances to one or more image sensors, the optical characteristic of visibility distance can be determined by reporting which markers are consistently detected or not detected. In clear visibility all markers will be detected, and as the visibility deteriorates only the closest markers will be detected. Previous methods would require either a human presence, or a live camera transmitting a full image back to an office which is expensive in data transmission.

In one aspect of the present invention there is provided a method for detecting a marker in an image, comprising the steps of detecting a marker in one or more previous frames of the image; using an edge detector to detect an edge in a current frame of the image; tracking line segment edges of the marker detected in the previous frame to find a new set of line segments; grouping the new set of line segments to provide a new set of polygons having salient points; calculating homography from polygon salient points; generating a list of homographies; extracting binary data from input image having homographies; verifying if the image is a marker by performing check sum and error correction functions; and if the image is a marker, identify as a marker and verify binary data; wherein the image is a consecutive image sequence.

In another aspect of the present invention there is provided a method for detecting a marker in an image, comprising the steps of: splitting the image into sub-images of smaller pixel size than the image; using a marker detection algorithm to detect a marker or portion of a marker in each sub-image; wherein each sub-image is a different region of the image from every other sub-image so as that over several image frames a marker is likely to be detected.

In a further aspect of the present invention there is provided a method for detecting a marker in an image, comprising the steps of: detecting a marker in one or more previous frames of the image; using an edge detector to detect an edge in a current frame of the image; determining blobs from centers of light or dark salient regions of similar brightness in the current frame of the image; tracking the centers of the blobs between frames; and determining motion of markers between frames by using the blobs.

In yet a further aspect of the present invention there is provided a system comprising: a collection of several image sensors attached together rigidly in a single frame, with each aimed at a different outward facing direction, for measuring position and orientation of the frame relative to an environment by detecting markers in the environment by using a marker detection algorithm. The several image sensors can be a multi-camera array that is used for the navigation of a mobile robot within an environment with markers mounted as navigation landmarks. The several image sensors can also be a multi-camera array that is within a wearable helmet for augmented reality or virtual reality (AR/VR) comprising: a helmet containing a display visible to a users' eyes; multiple outwards facing cameras that cover some or all sections of a complete spherical view; and an ad hoc arrangement of fiducial marker patterns mounted in the environment; wherein the display shows virtual computer generated imagery either to replace or to augment real imagery.

In yet a further aspect of the present invention there is provided a system comprising: various types of media content such as manuals, pictures of interior contents, maintenance information, notes, audio recording notes, video tutorials, PDF documents, warranty and reordering information; markers on the media content; wherein the markers are detected in an environment by using a marker detection algorithm.

In yet a further aspect of the present invention there is provided a visibility distance measuring system comprised of: capture means for capturing at least one video or still image; fiducial marker patterns located at various distances from the capture means and aligned with the capture means; and a processor for processing a marker detection algorithm with the video or still image from the capture means.

In yet a further aspect of the present invention there is provided an augmented reality system comprised of: capture means for capturing at least one video or still image, the capture means having a display screen; fiducial marker patterns located on one or more objects within view of the capture means; recognition means for recognizing the fiducial markers in the at least one video or still image; calculation means for calculating a mathematical transform between the display screen of the capture means and arbitrary world coordinates of the fiducial marker patterns; graphic drawing means for placing overlay drawings and graphics on the display screen; transmission means for transmitting the at least one video or still image to a remote location; and receiver means for receiving other overlay drawings and graphics from the remote location.

In yet a further aspect of the present invention there is provided an augmented reality system comprised of: fiducial marker patterns located on one or more objects or locations of interest at a remote location; capture means for capturing at least one video or still image of the fiducial marker patterns, the capture means having a display; recognition means for recognizing the fiducial markers in the at least one video or still image; transmission means for transmitting the recognized fiducial marker patterns to a central location; and receiver means for receiving visually displayed information associated with the remote location from the central location; wherein the visually displayed information is shown on the display.

In yet a further aspect of the present invention there is provided a system using a marker detection algorithm for processing imagery from one or more cameras aimed at a sphere that is constrained in position but has unknown changing rotation, comprising: markers mounted on the sphere; means for measuring a rotation position of the sphere without physical contact; determination means for determining a rotation, such as in rotation matrix, Euler angle, quaternion form; and output means for outputting the rotation.

In yet a further aspect of the present invention there is provided a remote control and/or augmented reality system comprised of: a) A mobile device with an outward facing video or still image capture, a display, a micro-computer, and optionally a network connection; b) Fiducial marker patterns printed and mounted on objects or locations of interest, c) Software, firmware, or hardware in said mobile device that can recognize said fiducial markers in the imagery captured by said mobile device's camera using a marker detection algorithm, d) "services" which are computer interfaces to some information or control functionality of interest to the user, such as databases or that which can be accessed from industrial automation systems, e) A webserver that is either on a remote computer or within the same mobile device that provides files for use in creating a graphical interface (labeled a "widget" herein) for communication with said services, f) (optionally) a network that provides data communication capability between the webserver and one or more mobile devices, if the webserver is not inside the mobile device, for the purpose of communicating these widgets and in the case of applications such as industrial SCADA systems possibly the services, g) Functionality in the mobile device to request widgets from the webserver according to a unique identifier of one or more fiducials detected in said camera's imagery, h) One or more web browsers inside the mobile device which draw the graphics of the widget on the display screen.

In yet a further aspect of the present invention there is provided an augmented reality implementation of the system wherein the mobile device is a smartphone or tablet where the widgets are drawn on top of the video or still image in positions over top of the image location of the fiducial markers.

In yet a further aspect of the present invention there is provided an augmented reality implementation of the system wherein the mobile device is a wearable device where the graphics shown on the display are positioned to coincide or correspond to the perceived direction as seen by one or both of the user's eyes (for example the Google Glass® wearable device).

In yet a further aspect of the present invention there is provided an augmented reality implementation of the system in an optical see through configuration where the display has controllable transparency so the user can see through the display thus providing the illusion of the web graphic 'widgets' appearing in a position that allows the user to associate the widget with the marker, either with the graphic drawn directly over the marker position or elsewhere in the display with some line or arrow or some means of visually associating the widget with the fiducial marker.

In yet a further aspect of the present invention there is provided a system where the mobile device is a smartphone or tablet where the widgets are drawn on top of the video or still image in positions which are a function of the image location of the fiducial markers in such a way to improve the visual quality of the view. This function would take the position in the display image of all detected fiducial markers as input and would output the location of the widget centers. A line or arrow or some indication may connect the marker location to the widget so that if the widget is not directly close to the fiducial the user would be able to see what fiducial the widget belongs to. Below are three possible elements of this function, the function may perform one, two, or three of these:
a) a low pass smoothing function or Kalman filter, DESP (Double Exponential), or similar which reduces the shaking and uttering of the widgets as that the image location of the fiducials may shake due to image noise and instability of the user's hand.
b) Adaption to prevent widgets from overlapping, they would push each other out of the way, such as bubbles bumping against each other
c) Adaptation to prevent widgets from not been fully seen because they extend beyond the display borders, such as if the fiducial markers are close to the border and the widgets are larger than the fiducials in the display image. In this case the widget's position would be adjusted inwards so it can be viewed in its entirety.

In yet a further aspect of the present invention there is provided a system where the mobile device is a wearable device containing one or two displays visible from one or both of the user's eyes where the widgets are drawn in position so they appear in the same direction as the fiducial markers, so they appear on top of the fiducial markers or are in display positions which are a function of the image location of the fiducial markers in such a way to improve the visual quality of the view. This function would take the position in the display image of all detected fiducial markers as input and would output the location of the widget centers. A line or arrow or some indication may connect the marker location to the widget so that if the widget is not directly close to the fiducial the user would be able to see what fiducial the widget belongs to. Below are three possible elements of this function, the function may perform one, two, or three of these:
a) a low pass smoothing function or kalman filter, DESP (Double Exponential), or similar which reduces the shaking and uttering of the widgets as that the image location of the fiducials may shake due to image noise and instability of the user's head.
b) Adaption to prevent widgets from overlapping, they would push each other out of the way, such as bubbles bumping against each other
c) Adaptation to prevent widgets from not been fully seen because they extend beyond the display borders, such as if the fiducial markers are close to the border and the widgets are larger than the fiducials in the display image. In this case the widget's position would be adjusted inwards so it can be viewed in its entirety.

In yet a further aspect of the present invention there is provided a remote control and/or augmented reality system for industry applications that provides industrial SCADA (industrial automation acronym for Supervisory Control And Data Acquisition) interaction comprising: a) a mobile device with an outward facing video or still image capture, a display, a micro-computer, and a network connection, b) Fiducial marker patterns printed and mounted on objects or locations of interest such as machines, sensors, valves, storage tanks, and other objects and locations of relevance in an industrial automation system, c) Software, firmware, or hardware in said mobile device that can recognize said fiducial markers in the imagery captured by said mobile device's camera, d) "services" which are computer interfaces to the SCADA information and/or control functionality of the industrial automation systems, e) a webserver that is that is connected over the network (such as wireless WIFI) to the SCADA system to provide files to describe the graphical interface (labeled a "widget" herein) for communication with said services, f) a network (such as wireless WIFI) that provides data communication capability between the webserver and one or more mobile devices for the purpose of communicating these said widgets which contain code (such as JavaScript) to communicate with SCADA systems through the said services, g) functionality in the mobile device to request widgets from the webserver according to a unique identifier of one or more fiducials detected in said camera's imagery, h) one or more web browsers inside the mobile device which draw the graphics of the widget on the display screen, and i) the use of convention world wide web graphics and interaction (eg. Html5, SVG, JavaScript) elements to facilitate easy development, the use of existing web design expertise, and the ability to preview full widget functionality in a conventional web browser.

In yet a further aspect of the present invention there is provided a system where there is a two stage process of communications between the mobile device and the server providing the widget functionality, where the two stages are: 1) the downloading of the visual appearance and functional software code in the first interaction with the server, and 2) a periodic request for real time SCADA data to update the widget, such as steam pressure, voltage, etc from a system element.

In yet a further aspect of the present invention there is provided a system where the visual appearance is created with HTML5 web page code using conventional HTML and SVG graphics elements and the use of JavaScript to provide functionality for changing graphics and interactions such as Jquery 'Ajax'.

In yet a further aspect of the present invention there is provided a system that provides a mechanism for assigning markers from the mobile device by displaying a default widget for unassigned markers.

In yet a further aspect of the present invention there is provided a system that provides a mechanism for assigning markers from the mobile device by displaying a default widget for unassigned markers.

In yet a further aspect of the present invention there is provided a system that provides a visual indication of how old the information displayed in the widget is, such as the color coded clock graphic in the upper right.

In yet a further aspect of the present invention there is provided a system that provides a visual indication of how old the information displayed in the widget is, such as the color coded clock graphic in the upper right.

In yet a further aspect of the present invention there is provided a system that provides a visual indication of how old the SCADA information displayed in the widget is, such as the color coded clock graphic in the upper right.

In yet a further aspect of the present invention there is provided a system for optical see-through wearable augmented reality systems where the camera field of view is larger than the display field of view (where field of view is defined as from the human user's eye viewpoint) where the widgets corresponding to markers which are in the view of the camera but out of the field of view of the display and hence cannot be simply displayed in line with the marker are displayed around the edge of the display with a visual difference such as reducing the size or appearance to convey to the user they lie outside the display range, also typically with a line or arrow pointing towards the marker so the user can associate the widget with the marker.

In yet a further aspect of the present invention there is provided a system where the visual appearance is created with HTML5 web page code using conventional HTML and SVG graphics elements and the use of JavaScript to provide functionality for changing graphics and interactions such as Jquery 'Ajax'.

In yet a further aspect of the present invention there is provided a system where the web server has a distinct "switchboard" component with which the mobile device(s) communicates to receive the widget information and pass messages in both directions to the appropriate "back end" service as a function of the type and ID number of each fiducial marker detected, where this said switchboard contains the mapping of what content to appear over which marker, and where this mapping is changeable by the user.

In yet a further aspect of the present invention there is provided a system where the switchboard mapping between the marker type and ID and the matching widget graphics and service is configurable with a web interface, i.e. one that can be viewed and configured by the user through the use of a web browser so the content appears as an interactive web page.

In yet a further aspect of the present invention there is provided a system where the switchboard component of the web server system component relays messages back and forth to "service" elements which are separate software programs which provide a bridge to protocols such as SCADA Modbus® or OPC Server systems.

In yet a further aspect of the present invention there is provided a system where there is a separate "service" executable software program for each outside system type, where each type could be a specific protocol such as a Modbus SCADA.

In yet a further aspect of the present invention there is provided a system where the address and routing information is contained within a URL where the first part is an IP address and port number corresponding to a "service" program and the remaining part of the URL contains identification elements for use in the domain handled by the service. For example a URL in the switchboard defining a service could be http://localhost:8000/Service/modbusTCP/192.168.0.169/502/1/9 where http://localhost:8000/Service/modbusTCP is the network address (likely in the same server computer) for the service handling the ModbusTCP® (copyright Schneider-Electric, Modicon) protocol to a SCADA system and 192.168.0.169/502 is the address of a node within the ModbusTCP network and 1/9 is the internal unit and address for data within that node.

In yet a further aspect of the present invention there is provided a system where the detection of fiducial markers is accomplished in part or in whole with custom hardware instead of the main processor, such as using a FPGA (Field Programmable Gate Array), ASIC (Application Specific Integrated Circuit), a DSP (Digital Signal Processor), or some combination of these three. This would allow faster detection of markers and/or detection in larger images without requiring a more expensive general purpose main processor.

In yet a further aspect of the present invention there is provided a portable remote control comprising: an outward facing image sensor whose image is processed by an image detection algorithm partly or completely implemented in custom FPGA, DSP, and/or ASIC technology which might reside in the same integrated circuit (on the same "chip", possibly a second "chip" in the same electronic component package), a touch sensitive display screen, a microcomputer with a web server, and a wireless network interface through which both interactive graphics (widget) is loaded and control actions are sent. Where this remote control is used for the control of equipment such as lighting, HVAC (Heating, Ventilation, Air Conditioning), arming or disarming alarm systems, machine control in industrial applications and similar applications where a device is controllable by a computing device. Where the remote control is used by the user simply aiming the device at objects with two-dimensional fiducial marker graphic patterns mounted on them, ideally where a fiducial marker has an intuitive psychological association with the object being controlled, even if the mechanical and electrical components are elsewhere.

In yet a further aspect of the present invention there is provided a wearable augmented reality device worn on the head, helmet, or eye-glasses of a user that contains an outward facing image sensor whose image is processed by specific image processing hardware designed to detect fiducial markers by an image detection algorithm partly or completely implemented in custom FPGA, DSP, and/or ASIC technology which might reside in the same integrated circuit (on the same "chip", possibly a second "chip" in the same component electronic device package), this said wearable device also containing one or more display devices that provide an image seen by the user in a way that they experience a combined view of the existing scene and graphic elements seen in the display, where the graphic elements are created by a web browser and mini-computer contained within the wearable device that receives graphics and computer information from a remote system via a wireless interface, where this graphics is created using elements of world wide web protocols and information is communicated using software that runs inside a web browser such as JavaScript, and that these graphic elements are drawn in a way that the user associates them with a physical object in their environment, most likely by simply placing the graphic component in a location on the display such that it coincides with the direction of the physical object as seen from the user's eye point of view. This display may be semi-transparent providing an optical see-through AR scenario.

In yet a further aspect of the present invention there is provided a system where user input, such as pushing an information button on a remote control, tapping the screen on a mobile device, or tapping some part of the wearable device, causes a special document reader for viewing and/or editing documents such as instruction manuals or training videos or other media, or an external web browser.

In yet a further aspect of the present invention there is provided a marker detection algorithm where the line segments are tracked by to searching for matching step edges along a set of search lines perpendicular to the original the line segments, with several search lines spaced along each line segment, out to a length determined by the estimated motion between frames. Several candidate "edgel" points may be found along each search line that may correspond to the new true marker line segment edge, and a set of possible new line segments will be created from the set of candidate "edgel" points from all search lines from an original line segment. From all the possible new line segments in the image a set of candidate polygons are created, for which in each polygon a homography relationship will be found to examine the digital pattern to decide if the polygon is a valid marker.

In yet a further aspect of the present invention there is provided a marker detection algorithm where the set of possible new line segments created from the set of candidate "edgel" points are created using a RANSAC (Random Consensus) approach (Fischler and Bolles 1981). The RANSAC approach being where subsets of the set of candidate "edgel" points are chosen to define test lines, to which the distance to the remaining "edgel" points are measured to determine how many "edgel"s support the test line, where the number of supporting "edgels" is used to determine if this test line is a valid line to output from the tracking stage.

In yet a further aspect of the present invention there is provided a marker detection algorithm where the candidate "edgel" points are found along the search line by using an edge detector filter, such as the Sobel edge detector, with a positive or negative threshold which must be exceeded to declare a candidate "edgel" point.

In yet a further aspect of the present invention there is provided a marker detection algorithm where the candidate "edgel" points are found along the search line by performing an image correlation operation between a section of the previous image and patches of pixels along this search line, where the correlation output is thresholded to declare a candidate "edgel" point.

In yet a further aspect of the present invention there is provided a marker detection algorithm where the original line segments input to the tracking algorithm are from non-marker objects in the previous image as well as from the sides of markers. These line segments are not considered of as high confidence as those tracked from the marker edges and treated specially when combining their input. These "non-marker line segments" are added to the calculations of determining the motion of marker(s) between frames, and/or to improve the 3-dimensional estimation of the markers relative to the camera to reduce the shaking of 3D virtual objects and the plane ambiguity problem, and described in Schweighofer and Pinz 2006. These "non-marker line segments" are followed from frame to subsequent frames and their 3-dimensional depth, or validation that they lay on the same plane as one or markers, is automatically estimated.

In yet a further aspect of the present invention there is provided a marker detection algorithm for use in a consecutive image sequence, where only a sub-image of the input image is used, of smaller pixel size than the input image, and where this sub-image is a different region for each subsequent image so as that over several image frames a marker is likely to be detected.

In yet a further aspect of the present invention there is provided a marker detection algorithm where the markers detected in previous frames are tracked in a sub-image or the entire image, thus allowing an update of the presence and position of all markers known by the algorithm to be updated with each image frame, even if the markers are not in the last sub-image of the sectioning algorithm.

In yet a further aspect of the present invention there is provided a marker detection algorithm using additional points from the centers of light or dark salient regions of similar brightness, so called "blobs", especially those from over-saturated regions of the camera image where excessive brightness from a light source such as a light or window (example greyscale=full 255/255), or excessively dark region with constant minimal brightness values (eg. Greyscale=0). These additional points are added to the calculations of determining the motion of marker(s) between frames. These points are not considered of as high confidence as the markers and treated specially when combining their input. These "blob" centers are tracked and their center locations in 3-dimensions automatically determined.

In yet a further aspect of the present invention there is provided a collection of several image sensors attached together rigidly in a single frame, with each aimed a different outward facing direction, to detect markers in the environment using the MDAs for the purpose of measuring the position and orientation of this frame relative to the environment.

In yet a further aspect of the present invention there is provided a system where the multi-camera array is used for the navigation of a mobile robot within an environment with markers mounted as navigation landmarks.

In yet a further aspect of the present invention there is provided a system where the multi-camera array is used for a wearable helmet for augmented reality or virtual reality (AR/VR) comprised of: a. A helmet containing both a display visible to the users' eyes (head mounted display=HMD). The HMD is either transparent or opaque for AR and/or VR operation, b. The display shows virtual computer generated imagery either to replace (VR) or to augment real (AR) imagery, c. multiple outwards facing cameras that cover some or all sections of a complete spherical view, d. an ad hoc arrangement of fiducial marker patterns mounted in the environment where the AR/VR session takes place.

In yet a further aspect of the present invention there is provided a system where the processing and graphics rendering is performed on a computing device mounted on the helmet, either as a full computer or a graphics unit (GPU).

In yet a further aspect of the present invention there is provided a system where the processing is all performed on a remote computer, such as a server in the "cloud".

In yet a further aspect of the present invention there is provided a system where the markers are detected by processing hardware or software built into the helmet, such as with FPGA and/or DSP hardware.

In yet a further aspect of the present invention there is provided a system where the resultant pose or projection matrix is determined using computing hardware built into the helmet.

In yet a further aspect of the present invention there is provided a system where the cameras are synchronized to have identical timing of image acquisition.

In yet a further aspect of the present invention there is provided a system where a similar system with multiple cameras and markers is used to position a hand-held device for use in conjunction with the helmet, or purely for navigation of a robotic system.

In yet a further aspect of the present invention there is provided a system where the detected markers' two-dimensional image coordinates are combined with 3D environment ("world") coordinates modified by the rigid rotation and translation of the cameras relative to the HMD or point in the assembly to calculate true pose or a projection matrix for direct use with the graphics system.

In yet a further aspect of the present invention there is provided a system where the true pose or projection matrix is updated with the measurements of an orientation sensor to provide updates during periods of rapid head motion or where the markers are not visible in the cameras.

In yet a further aspect of the present invention there is provided a system where an intermediate omnidirectional frame buffer is employed to reduce the latency of the graphics system to orientation changes, to reduce the "HMD pose latency problem".

In yet a further aspect of the present invention there is provided a system where audio output is generated with speakers mounted on the helmet to provide sound specific to that position and orientation in a virtual environment.

In yet a further aspect of the present invention there is provided a system where the virtual imagery is created from a real scene such as a tele-presence system where virtual views are combined with "view morphing".

In yet a further aspect of the present invention there is provided a system where the configuration of the markers (either their centers or salient points such as corners of square fiducial markers) are determined automatically in a unified coordinate system, such as by moving the helmet through the environment and employing methods such as "bundle adjustment" or "visual SLAM (Simultaneous Localization and Mapping)".

In yet a further aspect of the present invention there is provided system where this calibration step is performed with a remote or "cloud" computer to reduce processing necessary on the helmet device.

In yet a further aspect of the present invention there is provided a system where this calibration step is performed with processing on board the helmet device.

In yet a further aspect of the present invention there is provided a system where an entire computer system which performs all the following tasks: graphics generation (eg. 3D rendering), camera timing generation and image processing, and video game or visualization of data or designs, wireless communication to other helmet devices or computers.

In yet a further aspect of the present invention there is provided a system where each helmet communicates over WIFI wireless protocols to a single central computer which manages the design or game elements.

In yet a further aspect of the present invention there is provided a system where the system of helmet and markers is used for the purposes of AR or VR gaming where users "instrument" as space, such as a rented gymnasium, by mounting markers in an ad hoc fashion on the floor, wall, and/or ceiling surfaces and use one or more of these helmets to play first person perspective video games.

In yet a further aspect of the present invention there is provided a system where the system of helmet and markers (markers) is used for the purposes of architecture, CAD design, or scientific visualization where these helmets and hand-held devices are used to visualize, create, and modify 3D designs.

In yet a further aspect of the present invention there is provided a system where the system of helmet and markers is used to remotely view and operate equipment in a remote location, such as multiple people operating and supervising a bomb disposal robot or other tele-operation task with imagery combined from view-morphing of several video streams captured at the operation site.

In yet a further aspect of the present invention there is provided a system using the MDAs to associate various types of media content such as manuals, pictures of interior contents, maintenance information, notes, audio recording notes, video tutorials, PDF documents, warranty and reordering information.

In yet a further aspect of the present invention there is provided a system where the relative position, either a full 3-dimensional relative pose, or a 2-dimensional relative position, is automatically recorded by the system to enable in later searchers for a specific item, to provide instructions such as arrow graphics to the user to guide them to a marker ID associated with the object or location they are interested in.

In yet a further aspect of the present invention there is provided a system where this data is provided by a server and also accessible from conventional web browsers. The media can be uploaded and associated to markers either with the mobile devices or through a computer program or web page access on a conventional computer.

In yet a further aspect of the present invention there is provided a system where both the media and position information is stored and shared by a server.

BRIEF DESCRIPTION OF THE DRAWINGS

The invention will be further understood from the following description with reference to the attached drawings.

FIG. 17 in the left and middle show examples of invention prototypes consisting of the critical elements of display and multiple cameras looking in different directions, while the right image shows possible example of consumer gaming helmet.

FIG. 18 shows other methods for tracking: "outside-in" configuration.

FIG. 19 shows basic pinhole model for a single image sensor (camera).

FIG. 20 shows single camera equations.

FIG. 21 shows single camera DLT solution for unknown projection matrix elements given the known world and ideal image points.

FIG. 22 shows multiple cameras mounted rigidly on AR/VR helmet for localization.

FIG. 23 shows multiple camera equations, shown for one camera (cam0 from FIG. 22).

FIG. 24 shows conversion of each world reference point such as fiducial centers or corners or light/dark blob center, to 3D coordinates in the HMD coordinate system.

FIG. 25 shows optional system component: intermediate "omni-directional frame buffer" is used to minimize latency when users rapidly rotate their heads.

DETAILED DESCRIPTION OF PREFERRED EMBODIMENTS

The present invention discloses a marker detectable by visual means and inventions using the marker(s) for applications including multimedia graphics and industrial visualization. The present invention extends the "Main Detection Algorithm" with unique additions that take advantage of the fact that many applications of the marker detection are a sequence of image "frames", such as from a video camera, which contain similar content from frame to frame. Subsequent images as in a video stream from a hand-held or wearable device, or video camera on an automated device, are typically the result of camera and object motion but contain a lot of the same objects. The usage of knowledge from previous image frames can be used to achieve superior performance such as to provide faster processing, handle larger images with limited processing power, help estimate the marker position with an image frame when a marker is not detected, and improve the precise image measurements for applications such as 3D graphics in augmented reality applications and to address the plane ambiguity problem in such 3D graphics.

The first unique addition to the "Main Detection Algorithm" disclosed is named the "Auxiliary Tracking Algorithm" (FIGS. 3-5) and involves an image search for line segments along search paths perpendicular to a predicted position of an edge. In the first sub-method only the lines forming the edges of the markers' predicted boundary are used, and in the second sub-method line segments are also used from objects that are not markers but in the same scene. Those lines whose 3D depth are estimated are used to refine the marker image coordinates for applications such as more stable 3D augmented reality graphics.

Figure 6:
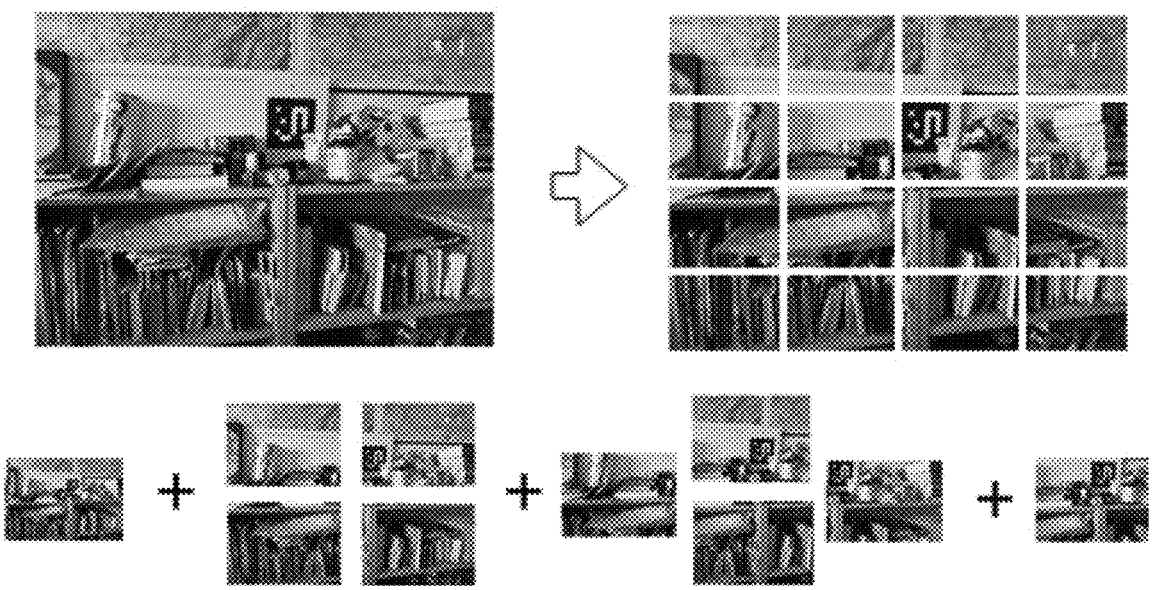
FIG. 6 shows the "Image Sectioning Algorithm" for improving frame rate (processing speed) for large images.

The second method to improve the marker detection, by a decrease the processing time, is named the "Image Sectioning Algorithm" herein (FIG. 6). It involves processing only a subsection (a sub-image) of each image received, with the sub-image portion of the image changing with each frame with overlapping regions. With sub-images of ½ by ½ dimensions only 25% of the image need be processed with each frame time permitting a system that can track markers in imagery with four times as many pixels with the same processing power computer. This method would typically be combined with the Auxiliary Tracking Algorithm which operates on the entire image since the Auxiliary Tracking Algorithm requires less calculation than the Image Sectioning Algorithm.

Figure 3:
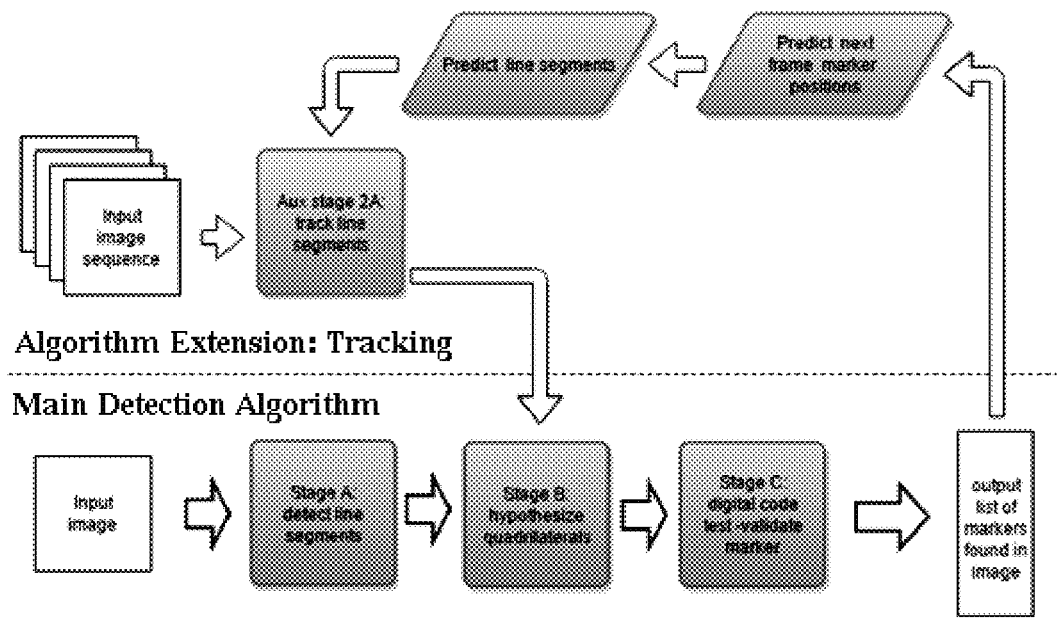
FIG. 3 shows the main and auxiliary marker detection algorithms.
Figure 4:
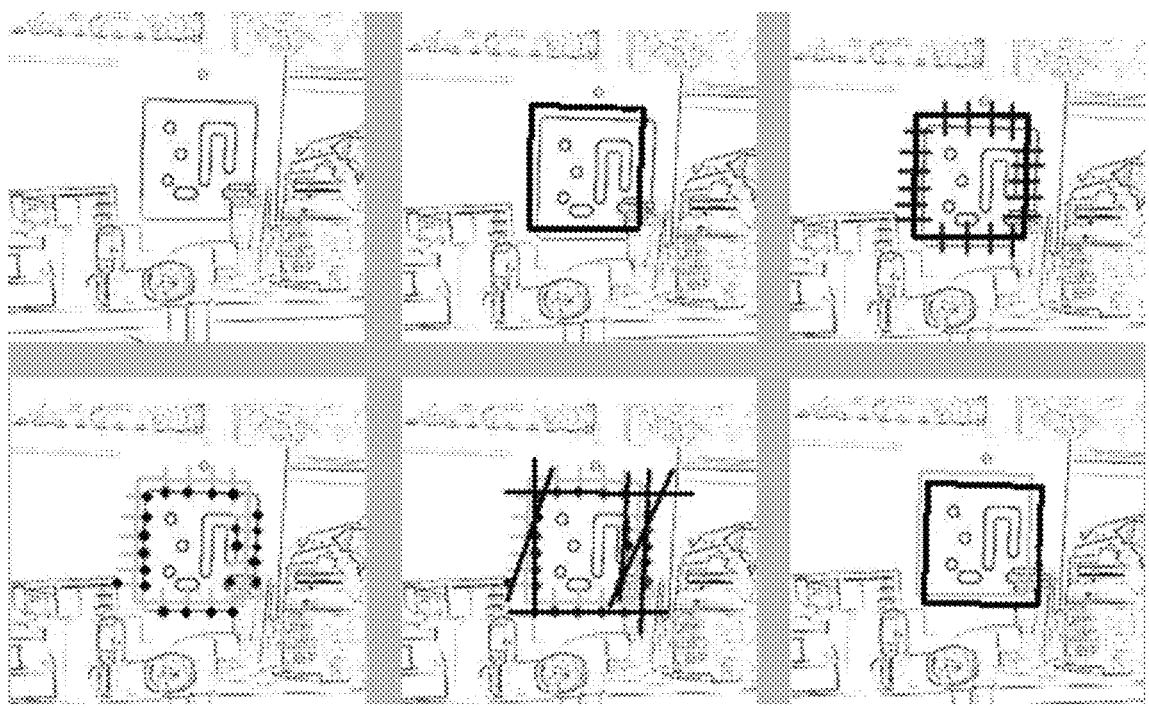
FIG. 4 shows the first "Auxiliary Tracking Algorithm" sub-method.

FIG. 3 shows the main and auxiliary marker detection algorithms. The main marker detection method processes a single image starting with no prior information, it is composed of Stage A: detection of line segments, Stage B:

combining line segments to create hypothetical quadrilaterals, and Stage C: testing the interior of each quadrilateral for those with valid digital codes to create an output list of markers within an image frame. The stages of the main algorithm are depicted in the lower row. Stage A is the most processor intensive and the majority of the processing time is spent by this stage, this is one motivation for the extensions disclosed in the present invention. The auxiliary detection method tracks detected markers from previous frames by predicting and then updating the markers' border line segments. The stages of the auxiliary tracking detection method are depicted in FIG. 4. The line segments predicted are either from just the markers in the first "Auxiliary Tracking Algorithm" sub-method, and are from scene objects which are not markers in the second "Auxiliary Tracking Algorithm" sub-method.

Figure 1:
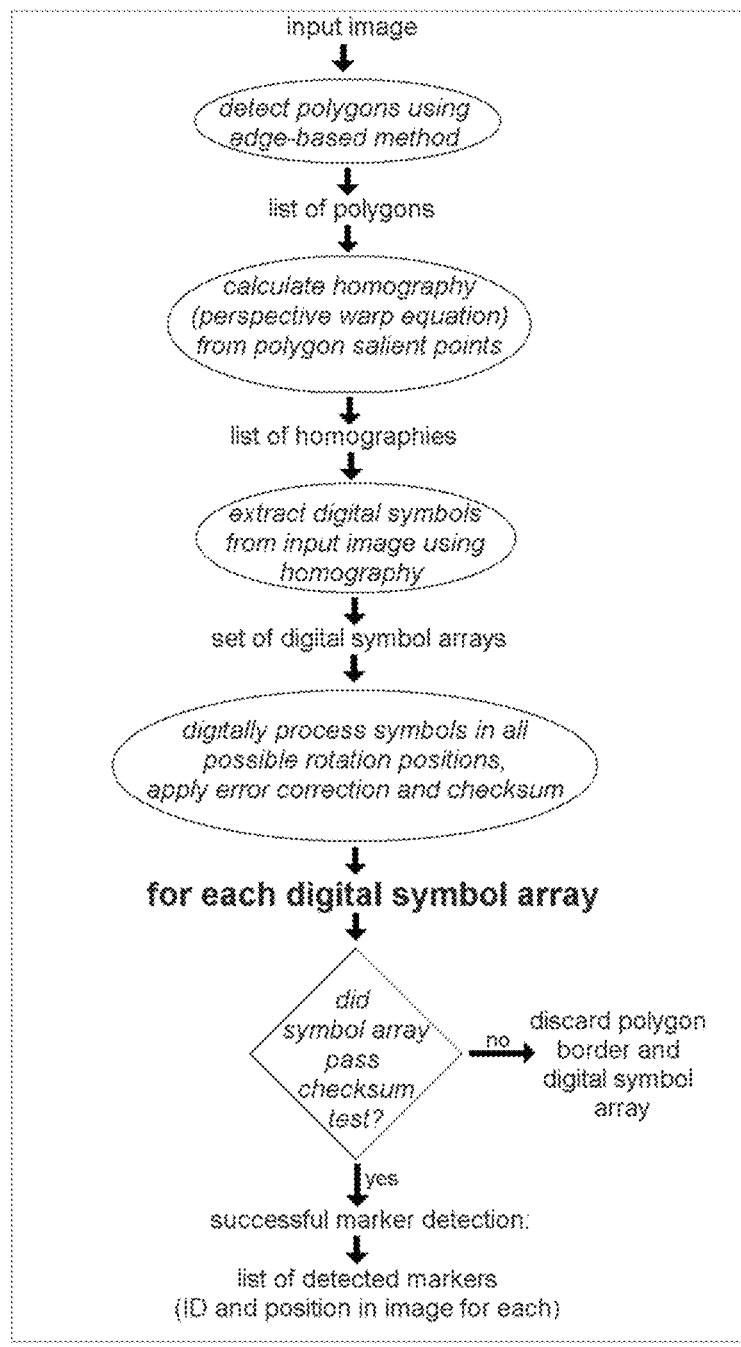
FIG. 1 shows the "Main Detection Algorithm".
Figure 2:
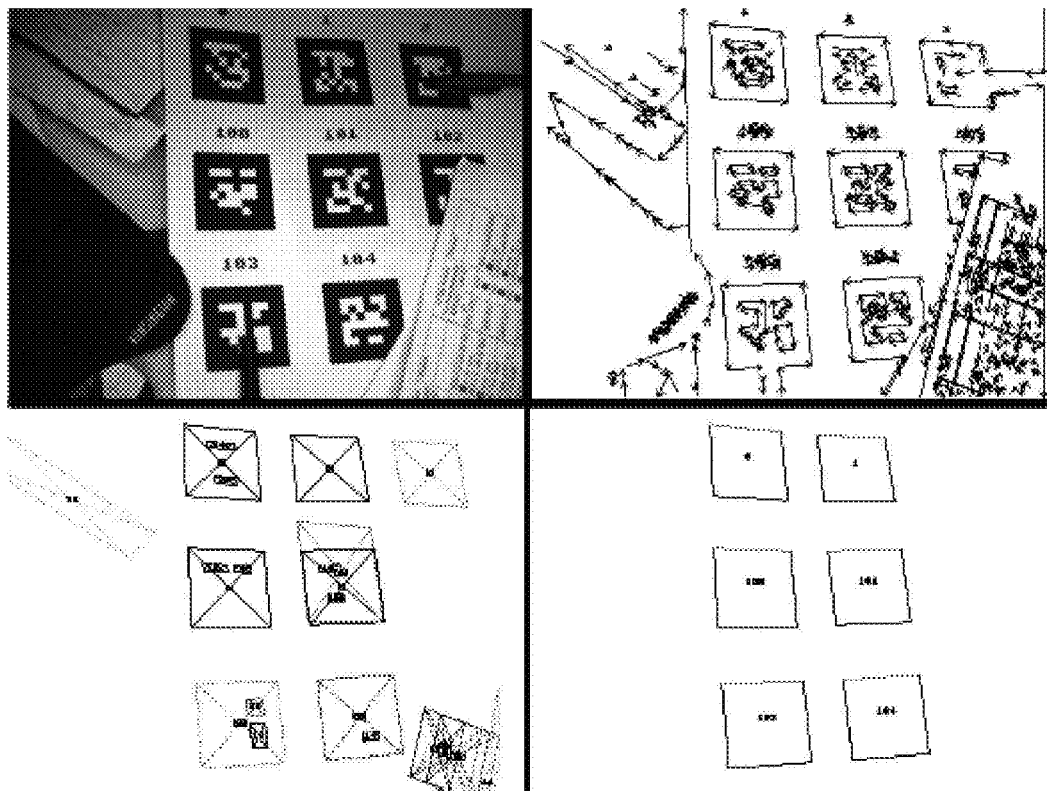
FIG. 2 shows more details of the "Main Detection Algorithm" depicted in FIG. 1.

FIG. 4 shows the first "Auxiliary Tracking Algorithm" sub-method. This is an extension of the "Main Detection Algorithm" for frame to frame tracking, when a consecutive set of similar images are used such as a video stream. The marker detection processing time is reduced by not processing the entire image to find line segments, rather to find new lines close to the four lines from the original marker from the previous frame. A set of search lines perpendicular to the original marker sides are shown in black in the upper right image. Edges along these perpendicular search lines points are detected having the same polarity of edge (dots in lower left image). New possible line segments are created from these detected edge points and combined into candidate quadrilaterals which are then examined using the digital analysis. Note that the combination of line segments into candidate quadrilaterals and examination of interior digital codes are the same steps as in the main detection algorithm, the process starting with "list of polygons" from FIG. 1

Figure 5:
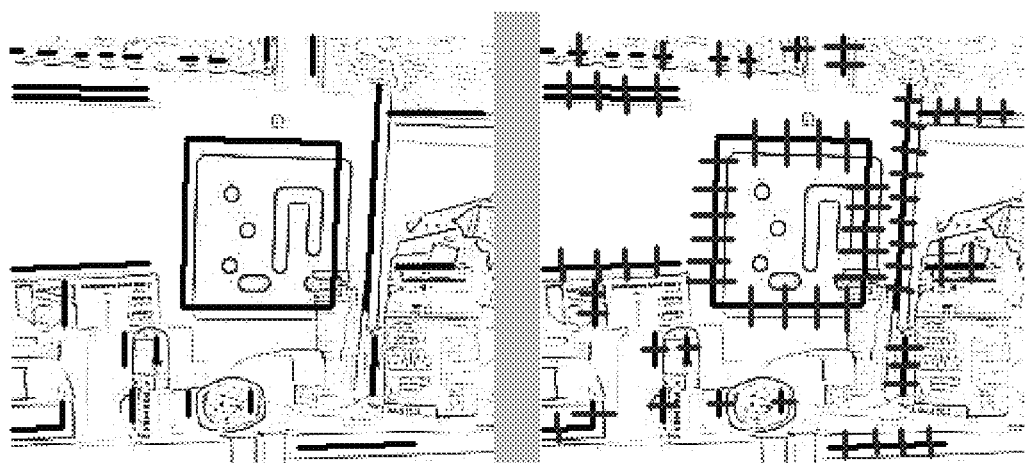
FIG. 5 shows the second "Auxiliary Tracking Algorithm" sub-method.

FIG. 5 shows the second "Auxiliary Tracking Algorithm" sub-method. A further extension of the marker boundary line tracking approach to include lines in the surrounding image. Prominent line edges can be tracked to new hypothetical positions in the latest image frame in an image sequence (such as video), these additional line edges not from marker sides are not used to define possible marker edges, but to perform two functions: estimate what the position a marker should be if it is not detected in this image frame, and to adjust slightly the homography for the marker to provide more stable 3D augmentations to prevent or reduce the pose ambiguity problem shown in FIG. 7.

FIG. 6 shows the "Image Sectioning Algorithm" for improving frame rate (processing speed) for large images. Instead of processing the entire image from an image sequence (such as video input), only 25% of the pixels are processed each frame time, with a different 25% each time. The input image size is split into one ½ resolution reduced size image and 9 sub-images each only ½ of the width and ½ of the height, staggered in 9 overlapping spots to ensure coverage of the entire image size. Bottom row left to right: input image reduced in resolution ½×½, the upper left, upper right, lower left, and lower right quarter, followed by the top middle, bottom middle, left middle, right middle, followed by the center ½×½ region. In total 10 sub-images are processed, each 25% of the original pixels but processed at 4× the speed, taking 10 frame times to go through the entire set of images.

The third method to improve the marker detection system involves the tracking between subsequent image frames regions of uniform light or dark regions, called "blobs", particularly those of saturated bright regions such as those from light sources. Typically when an image sensor which is configured to collect an image from an environment such as an indoor scene, or a night scene, is aimed at light sources such as room lighting or outdoor street lights, the light intensity is too bright to distinguish features within this light and the image sensor detects simply a region of uniform maximum intensity (often accompanied by over-saturated entire horizontal or vertical lines within the image depending on the sensor design). These "blobs", especially those from light sources, are useful for determining the motion of the camera relative to the scene if the "blobs" from one image frame can be matched with those from subsequent frames. The markers in the scene provide reliable anchor points between frames from which the association of "blobs" can proceed even when previous "blob" associations between frames are wrong. These "blobs" assist both in determining inter-frame motion as well as reducing the 3D virtual object jitter and the planar ambiguity depicted in FIG. 7.

Figure 7:
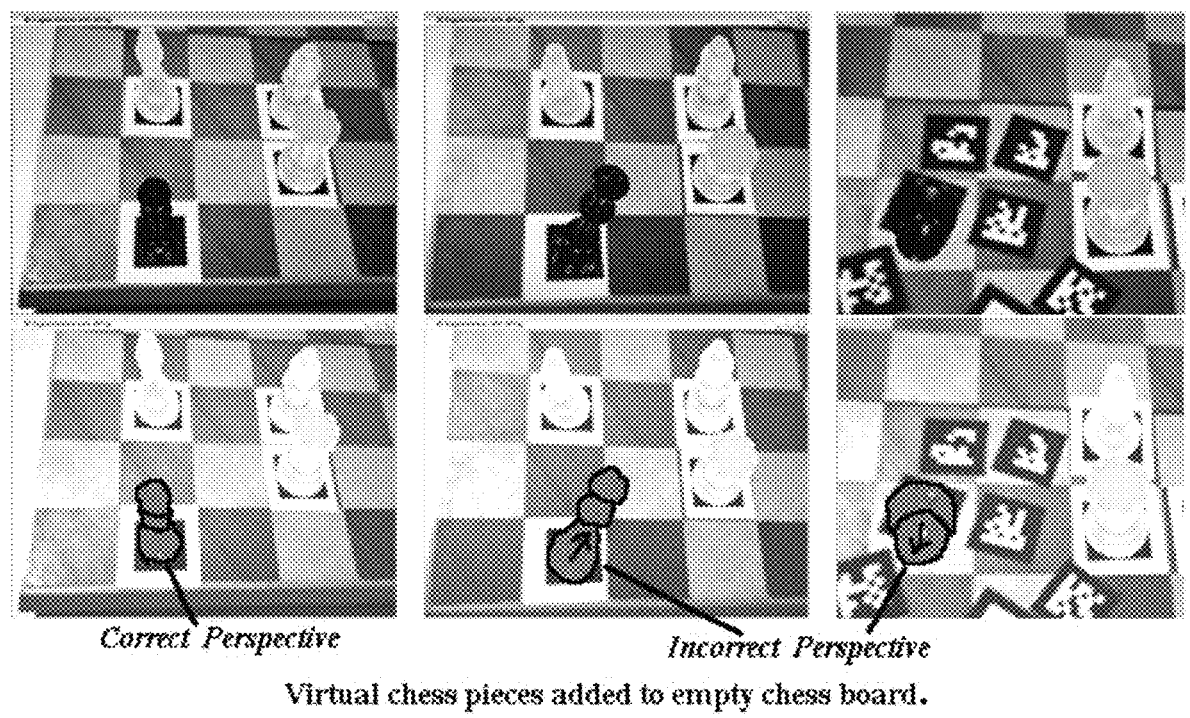
FIG. 7 shows a pose ambiguity problem and provides an example of 3D augmentation errors.

FIG. 7 shows a pose ambiguity problem and provides an example of 3D augmentation errors. The chess pieces are virtual and do not exist in the real scene, they are drawn using computer graphics in each frame relative to detected markers to give the illusion of the chess pieces existing in the scene. However, the 3-D virtual objects can be drawn incorrectly. Left to right: correctly drawn black chess piece drawn over marker, small change in marker outline causes incorrect extraction of 3D pose and back chess piece is drawn incorrectly leaning right, further deterioration of pose shows black chess piece appears up-side-down. These large 3D errors are due to the small size of the marker with respect to the scene, the marker sides are nearly parallel to each other causing this planar ambiguity, even though the entire image has sufficient parallax to correctly establish perspective. The pose ambiguity problem with respect to planar situations (such as markers) is described in Schweighofer and Pinz 2006 (refer to Reference list).

For this document the term "MDAs" is defined as marker detection algorithms, such as described in U.S. Pat. No. 7,769,236 B2 or such as the above mentioned marker detection methods ("Main Detection Algorithm", "Auxiliary Tracking Algorithm", "Image Sectioning Algorithm", "Assisted Blob Tracking Algorithm" or some combination thereof.

A single marker or multiple markers are useful for many applications as "fiducial" points which allow correspondences between imagery and the environment containing the markers.

Figure 8:
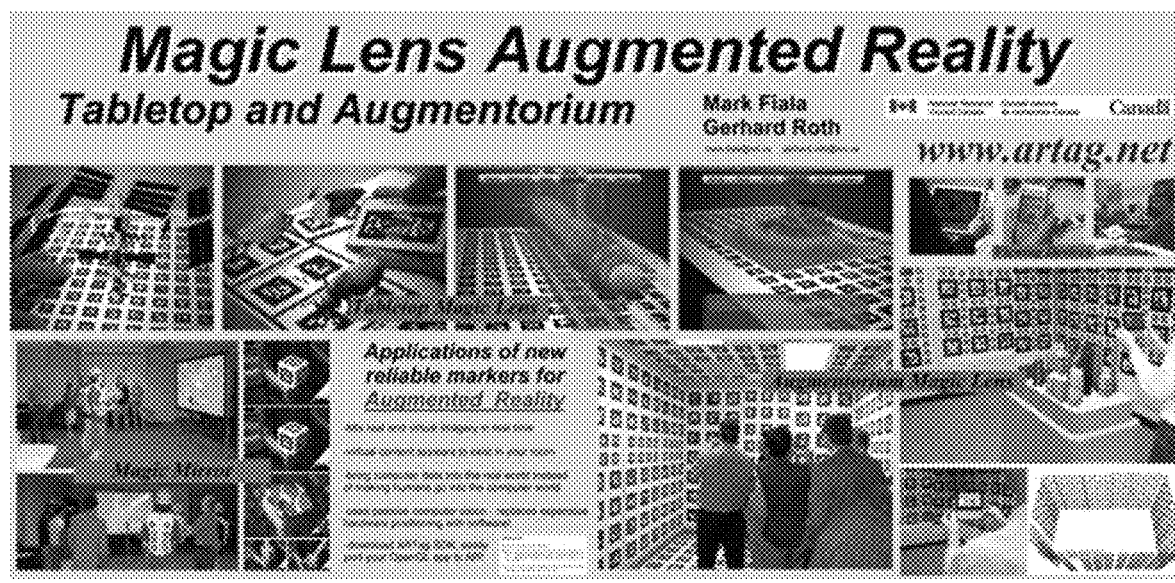
FIG. 8 shows a multimedia "augmented reality" application for using multiple fiducial markers.

FIG. 8 shows a multimedia "augmented reality" application for using multiple fiducial markers: "magic lens" for hand-held tablet/phone devices, "magic mirror" with markers worn or held by users, and "augmentorium" where entire room is used for localization and 3D graphics.

Figure 9:
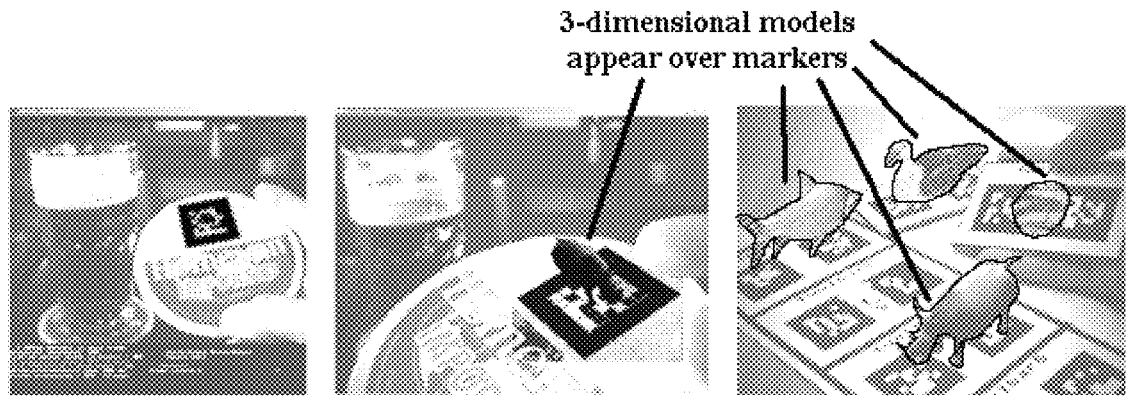
FIG. 9 shows an example of 3D graphics drawn relative to detected fiducial markers.

FIG. 9 shows an example of 3D graphics drawn relative to detected fiducial markers. Left to right: marker on drink coaster detected, 3D rhino model appears to sit on coaster, other 3D objects drawn over top of markers.

Figure 10:
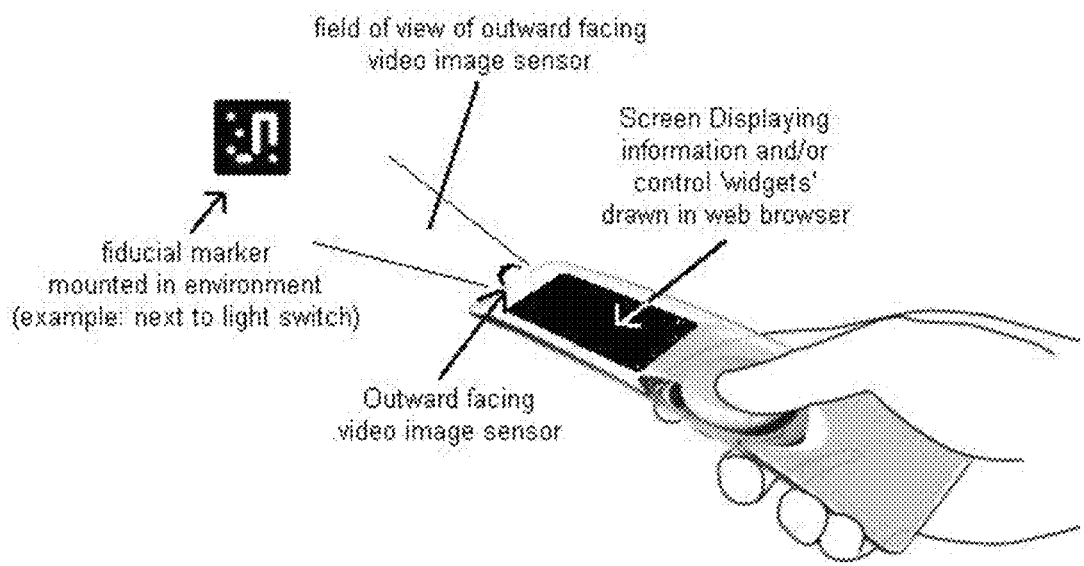
FIG. 10 shows an example of fiducial markers being used for remote control.

FIG. 10 shows an example of fiducial markers being used for remote control.

Content shown depends on a fiducial marker seen by an outward facing video camera. For example, a light control or security system menu may appear.

Figure 11:
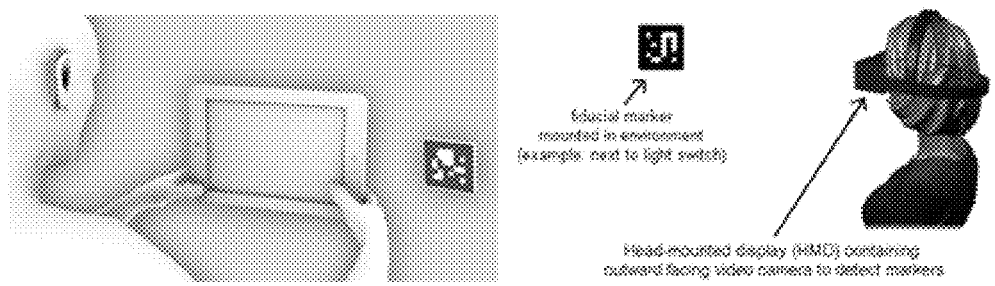
FIG. 11 shows two examples of users experiencing "augmented reality" with the aid of fiducial markers.

FIG. 11 shows two examples of users experiencing "augmented reality" with the aid of fiducial markers. A user is 'looking through' hand-held or wearable mobile device at fiducial marker. The display screen shows live video or still image with overlaid graphics. The user sees a combination of the input image or video and computer generated content.

Figure 12:
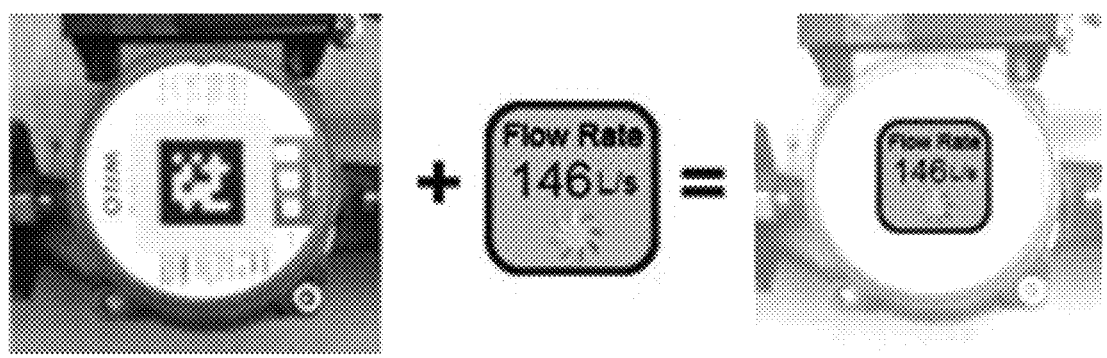
FIG. 12 shows an industrial application with sensor data.

FIG. 12 shows an industrial application with sensor data. Overlaid graphics placed on still or live video image over top of where detected markers are seen in the input imagery.

Figure 13:
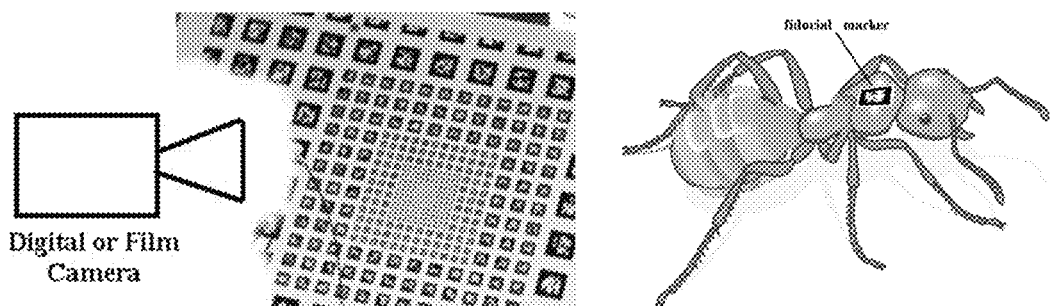
FIG. 13 shows two more applications of fiducial markers.

FIG. 13 shows two more applications of fiducial markers. Film studio cameras are calibrated by surveying an array of markers, and insects are tracked in entomology research by affixing markers to their backs. Fully automatic processes using computer vision enable new types of sensors, allowing automatically obtained measurements without physical contact, such as the examples of using fiducial markers shown in FIG. 13.

Figure 14:
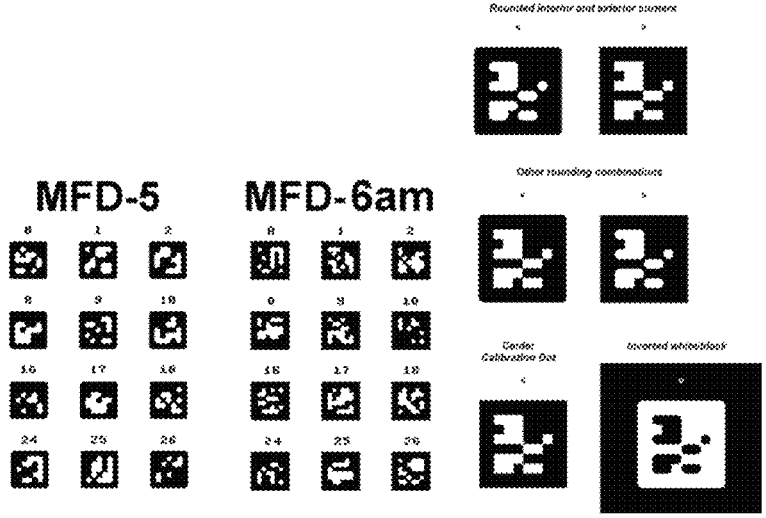
FIG. 14 shows different marker styles for different applications.

FIG. 14 shows different marker styles for different applications. The interior digital pattern can vary with the number of desired unique marker patterns (left table). The markers can have square or rounded edges and interior, and the marker can have a black quadrilateral on a white background or vice versa.

Figure 15:
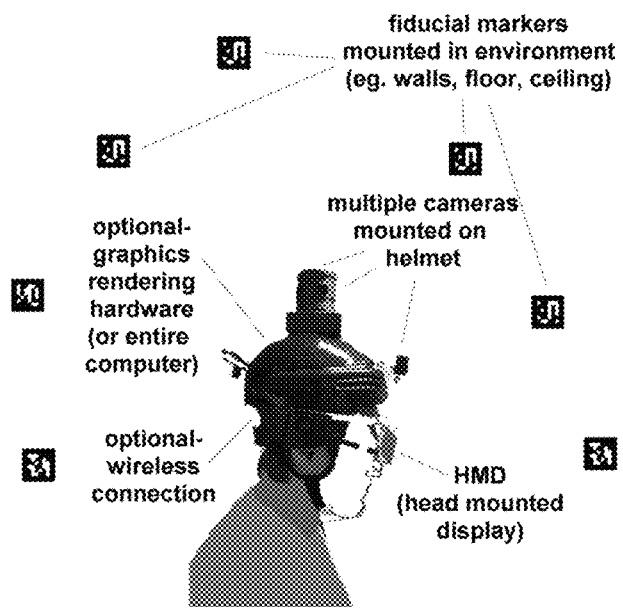
FIG. 15 shows a system diagram of Multi-Camera Array used in a wearable AR/VR (Augmented Reality, Virtual Reality) helmet.

FIG. 15 shows a system diagram of a Multi-Camera Array used in a wearable AR/VR (Augmented Reality, Virtual Reality) helmet. Several outward facing cameras are rigidly mounted to the helmet and aimed outwards to track markers and features to calculate the position and orientation of the helmet with respect to the environment.

Figure 16:
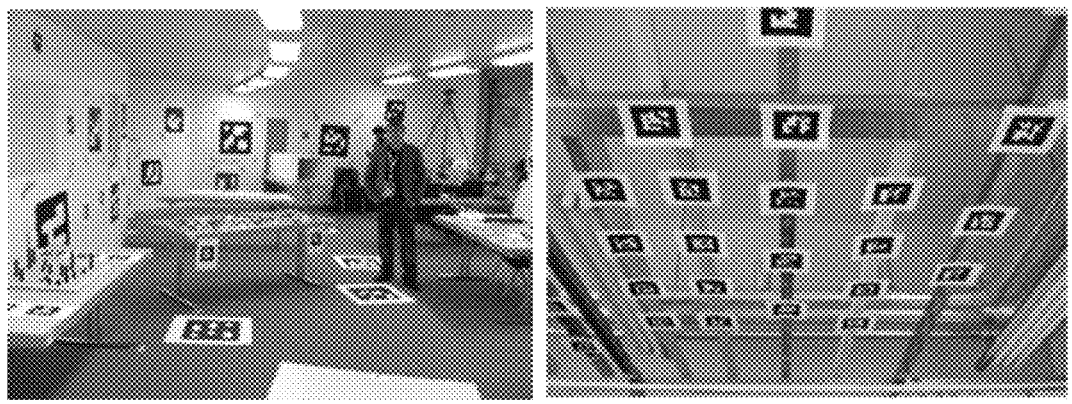
FIG. 16 shows examples of 'ad hoc' placement of marker patterns in a room on the left, while the right shows an example of markers placed only on the ceiling.

FIG. 16 shows examples of 'ad hoc' placement of marker patterns in a room on the left, while the right shows an example of markers placed only on the ceiling. In the left image, the marker patterns are put up quickly on any empty and convenient wall, ceiling, or floor surface. Note that the markers don't need to be as large as the ones shown. In the right image, the markers are placed only on the ceiling. Note that with the extensions to the main detection system disclosed in this invention, not as many markers would be needed for tracking.

FIG. 17 in the left and middle show examples of invention prototypes consisting of the critical elements of display and multiple cameras looking in different directions, while the right image shows possible example of consumer gaming helmet.

FIG. 18 shows other methods for tracking "outside-in" configuration. Cameras, usually with lighting sources, view constellations of reflective balls to calculate pose. The left image shows a diagram of multiple cameras looking in at reflective spheres mounted on hockey player, as taught by US patent publication number 20030095186. The right image shows Vicon brand cameras. The use of fiducial markers removes the need for expensive extra equipment traditionally used for tracking position as depicted in FIG. 18.

The present invention teaches several applications which use the MDAs. Also taught herein are two systems containing multiple image sensor elements combined in an array where the imagery from each image sensor is processed using the said algorithms, named "Multi-Camera Arrays" herein. The first Multi-Camera Array is a "panoramic array" where multiple image sensor elements are fixed solidly to the same common frame and arranged looking outwards in order to detect markers all around for the purpose of calculating the position, orientation and possibly motion of the frame relative to an environment or other objects containing these markers, as it passes through this environment or moves relative to these other objects. This removes the need for extra special equipment traditionally used involving specialized equipment as depicted in FIG. 18. An anticipated application of this Multi-Camera Array is to be part of a "Virtual/Augmented Reality Helmet" depicted in FIG. 15. A second "Multi-Camera Arrays" invention disclosed herein has each image sensor covered with a different optical filter to allow the array to detect markers in applications of high dynamic range of light intensity, such as found in applications such as automatic docking systems for spacecraft and satellite retrieval, where the difference between bright and dark lighting exceeds the range from light to dark for a single exposure due to a single filter and iris setting.

Another aspect of the invention disclosed herein is an application where images from one or more image sensors on a mobile are processed using the said algorithms to enable a logistics system, such as would be used in a warehouse. The present invention both solves the "what is in this box" problem as well as using learned past relative locations of markers to provide guidance to a specific location or object, such as a warehouse box. The present invention can be used solely on a single mobile device, or can be networked providing information available to other mobile devices and users searching for information on the objects or locations adorned with markers.

Another aspect of the invention disclosed herein is an application of augmented reality where one or more computer "web browser" is instantiated to correspond to each marker detected by one of the said marker detection algorithms. This is a method for easily creating and deploying interactive graphics for "augmented reality" (AR) applications. Fiducial markers placed in the environment are detected by a mobile device. The interactive graphics to show the user is provided by web graphics such as html. Typically the actual content creation of AR systems is application specific programming and graphics. Instead with the present invention the creation of interactive content is accelerated using conventional web graphics and interaction primitives, and the augmented reality software can be made simpler by leveraging these existing web assets. Three embodiments of the user's mobile computing device are described for this web-browser based AR system: a remote control device with display screen and outward facing video camera, a consumer phone or tablet device, or wearable mobile devices worn on the user's head. In the first embodiment the web page is simply displayed on the remote control's display screen. In the second and third embodiment the graphics are shown in a moving virtual web browser window positioned over one or more detected markers. This virtual web browser window is placed over a live view and a 'widget' appears which was written in html or other web standard languages. In all three cases the widget content is downloaded from a conventional web server onto the mobile device, and displayed over the detected position of a 2D printed marker.

Tracking Spherical Objects

Figure 51:
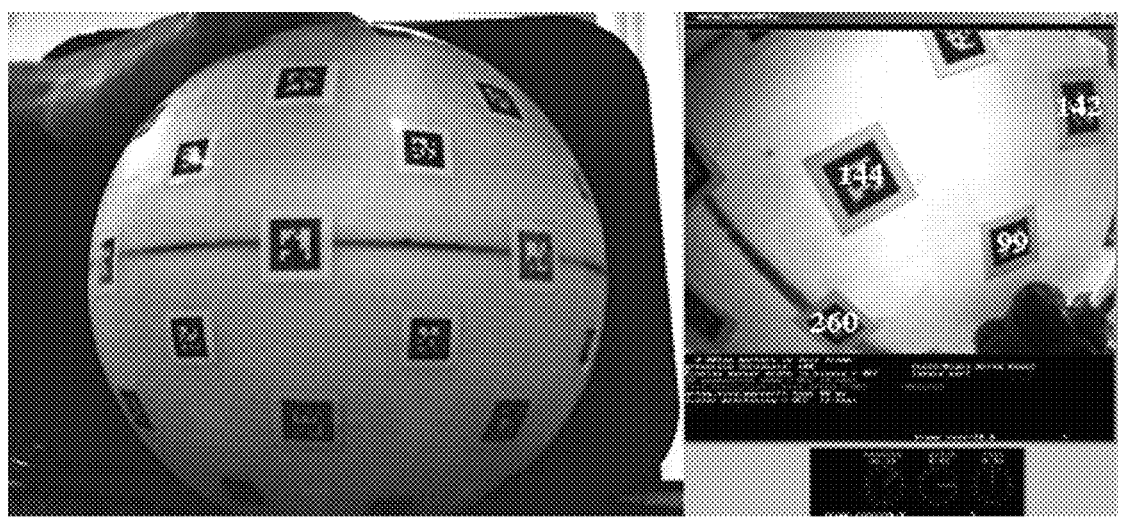
FIG. 51 shows an application of fiducial markers for tracking a sphere turning inside a fixed assembly.

The present invention also sets forth a unique tracking system for spherical objects whose rotational position need to be tracked, such as that of a simulator as depicted in FIG. 51. The image sensor with MDAs detecting markers placed on the sphere allows for real time contact-less determination of rotation.

FIG. 51 shows an application of fiducial markers for tracking a sphere turning inside a fixed assembly. Applications such as flight or space simulators desire the ability to rotate continuously in any direction without reaching some mechanical or wiring limit to simulate the unrestrained rotation of an aerospace craft. It is difficult to measure the rotation with conventional instruments, attaching markers and observing with a video camera provides this rotation.

Visibility

Figure 50:
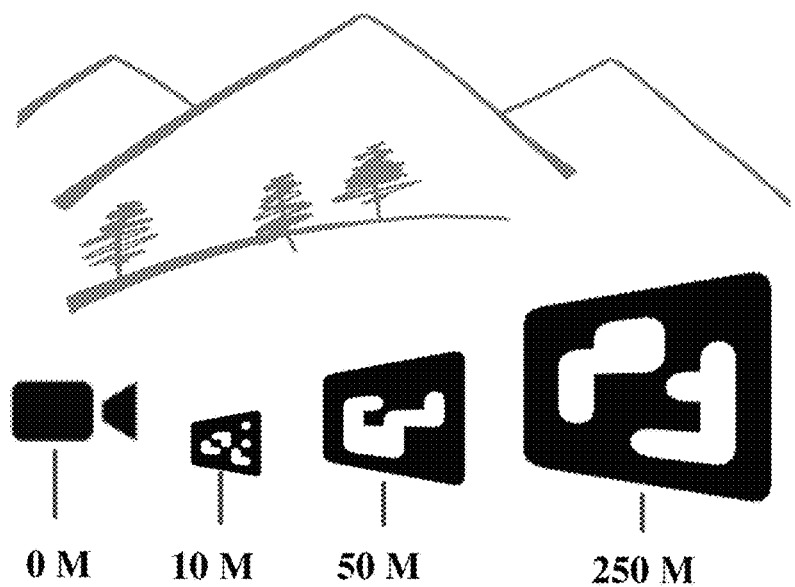
FIG. 50 shows a diagram of automatic visibility distance smart camera system using fiducial markers.

Another aspect of the use of MDAs of the present invention is shown in FIG. 50. Fiducial markers are mounted at fixed distances relative to a fixed video or still camera.

The fiducial markers detected by the said algorithms provide a reliable binary result of whether a marker was visible or not. By placing markers at different distances to one or more image sensors, the optical characteristic of visibility distance can be determined by reporting which markers are consistently detected or not detected. In clear visibility all markers will be detected, and as the visibility deteriorates only the closest markers will be detected. Such systems could be deployed to remote locations and only a few bits of data would be sent back to report this measure for instant analysis at a main office, and/or this measure could be recorded to a data-logger for later analysis.

FIG. 50 shows a diagram of an automatic visibility distance smart camera system using fiducial markers. Fiducial markers are mounted at fixed distances relative to a fixed video or still camera. Depending on the visibility of the environment, such as outdoor weather, all, some, or none of the fiducials will be visible. With these example distances, if the visibility is only 25 M then only the first marker will be detected by the computing system processing the imagery from the image sensor.

Multi-Camera Array for AR/VR Helmet

An application of the Multi-Camera Array invention disclosed is the helmet application, a method of creating a wearable system appropriate for "augmented reality" or virtual reality graphics.

The "holodeck" is a recognized science fiction concept that virtual reality (VR) aspires to create. In the "holodeck" (USPTO trademark application 75212723) a user can move about a space and senses computer generated objects and environments that are not real. With a head-mounted display (HMD) and an accurate pose (position and orientation) measuring device (a "tracker" or "localizer") the visual and audio senses for this holodeck concept can be realized. With VR all the sensory data provided is generated by the computer, whereas with "augmented reality" computer generated graphics and sound are added to the users' sensory input. The tracking accuracy needed for a convincing merging of real and virtual objects is higher with AR. Video gamers and many CAD (Computer Assisted Design) users have needed such a system. The display technology, the HMD's display screens (with optional audio speakers) have been around for some years with a recent improvement with the "Oculus Rift" ® headset. However, the pose tracking technology, that is low cost and practical to install, to make the holodeck a reality has been lacking.

With the present invention a user can move around while seeing virtual computer information, thus providing the illusion of the user co-existing in the computer world. The user wears this system on their head which contains both a display and a positioning (localization) system that calculates the position and orientation of the system relative to the markers in the environment so that the virtual information can be drawn from that perspective. One aspect of the design includes a single unit where the display, localization tracking cameras, and a full graphics system are all contained within the wearable device. This allows the view to be drawn rapidly as the user moves their head without waiting for delays from a computer image from a computer also worn on the person or images transmitted wirelessly. And a further improvement is disclosed by which all or part of the entire panorama of what the user could see is rendered by a computer and rotated to accommodate rapid orientation movements by the user to provide the small latency time necessary to satisfy the human visual system.

Localization is an unsolved challenge facing augmented reality (AR) and virtual reality (VR) systems. While orientation sensors built into many wearable Head Mounted Displays (HMD's) provide a certain accuracy suitable typically for VR only, position tracking is not considered a solved problem with a practical solution. The present invention addresses the problem with a design where a few patterned markers only need be placed in the environment, indeed less markers need to be placed if the "Auxiliary Tracking Algorithm" or "Blob Tracking" extensions are used. In one implementation of the present invention, a true pose is not actually calculated but rather only the necessary "projection matrix" needed in the computer graphics system. A typical application is a consumer video gaming situation where a large room, hallway, or entire floor of a building could be easily converted into a gaming arena by printing out a set of patterns with a conventional printer and sticking them to convenient wall or ceiling places. Another application is an architectural or chemistry design office where a room is specially fitted with more permanent marker patterns in the walls, ceiling, and floor.

Also novel, in one variant of the present invention, is the mathematics of producing a 12-element projection matrix instead of a true 6 degree of freedom (6-DOF) pose for use in rendering the virtual content providing better accommodation of the unavoidable small measurement errors. Furthermore this can be incrementally adjusted with relative motion information from orientation sensors. The same technology could be repeated for hand-held objects such as control wands or weapons in "first person shooter" video games.

The present invention also discloses the design of a single unit where the display, localization tracking cameras, and a full graphics system are all contained within the wearable device. This allows the view to be drawn rapidly as the user moves their head without waiting for delays from a computer image from a computer also worn on the person or images transmitted wirelessly. And a further improvement is disclosed by which all or part of the entire panorama of what the user could see is rendered by a computer and rotated to accommodate rapid orientation movements by the user to provide the small latency time necessary to satisfy the human visual system. Also in a practical system would be sensor fusion with an orientation sensor or IMU to provide constant pose information when the helmet is moving too quickly for markers to be recognized, or if the helmet moves to locations where sufficient number of world reference points such as markers cannot be seen.

Yet another additional aspect is a system where an intermediate "omni-directional frame buffer" is used to minimize latency when users rapidly rotate their heads. The graphics pipeline renders into an omnidirectional buffer, such as 6 sides of a cube, and a previously generated buffer is used to generate the planar view corresponding to the current user's viewpoint in non-stereo systems. This makes possible latencies of less than 16 ms, as is determined to be necessary by human interface research.

It is desirable, but not completely necessary, for the cameras to be synchronized, so they are all capturing images at the same points in time. Therefore in the ideal embodiment a single set of timing signals generated by the helmet computer are sent to all the video image sensors. Also desirable is the implementation of the fiducial detection and line/blob tracking in low level hardware such as FGPA, DSP devices, or a combination for low cost and high frame rate operation where the computer only needs to perform the matrix operations described herein and to load and modify 3D object geometry sent over wireless channels to other similar helmets or a main controller.

The optional but recommended mathematical processing of the detected fiducial locations in the cameras using the DLT equations to provide the projection or "modelview" matrix (in OpenGL graphics) directly without an intermediate calculation of a true rotation and position pose is also novel and avoids jittery and unstable graphics typical with expected inaccuracy.

The steps performed every frame time (ideally the cameras are synchronized such that there is only one time all image frames are available) are:

1. Find fiducial (marker) corners or centers in each camera image using MDAs,
2. Optionally find the light/dark blobs from features such as over-saturated regions of the image of overhead lights or windows. Since these features are not unique, this can be done by first predicting and then updating their position.
3. Optionally predict and track line segments,
4. Adjust for possible image warping of point and/or line coordinates in the images such as radial and thin prism distortion. These distortion effects are present in all cameras but especially in the low cost wide angle optics likely used in this AR/VR helmet.
5. Convert the image coordinates to the "ideal image coordinates" homogeneous [i,j,1] vector as in FIG. 20 (left),
6. Convert the 3D world coordinates [Xw,Yw,Zw] of the reference points in the environment such as the center or corners of fiducial's or light/dark blob centers to HMD coordinates [Xhmd,Yhmd,Zhmd] using the fixed Rcam,Tcam relative pose for the camera in which the fiducial was recognized.
7. Create two rows of the A matrix and optional B vector for each ideal image homogeneous vector [i,j,1] and 3D converted point [Xhmd,Yhmd,Zhmd]. Solve either AX=B or AX=0 system of equations. Use the former when the HMD is guaranteed not to come near the origin of the world coordinate system, or for more generic flexibility solve the latter equation using SVD methods finding the null space X. This vector X contains the projection matrix (without virtual camera parameters) that can be loaded into the graphics system such as with the load matrix or GLMultiplyMatrix function in OpenGL, GL-ES.
8. If features such as lines or light/dark blobs are used, there might be a matching error, so perform "RANSAC" (Random Sampling Consensus) sampling of a minimal subset of 6 points and repeat step 7 until a solution is found.
9. Optionally if no fiducials or features are found in this image and an orientation or IMU sensor is mounted in the helmet, either combine this information with a Kalman filter approach (likely requires conversion to true pose) or adjust last found projection matrix by replacing the leftmost 9 elements with the result of post-multiplying these elements with a rotation matrix R containing the relative motion detected by the orientation sensor. Likewise transform the position encoded in the rightmost 3 vertical elements with matrix operations (such as $[P14,P24,P34]=CRC^{-1}$ where C is the leftmost 9 elements of projection matrix X.

An optional but important part of the invention is the use of automatic calibration systems for either or both of the determination of relative R,T offsets of the cameras relative to the HMD in the factory, and the more often performed determination of the 3D world coordinates of the fiducial centers or corners. In the latter, users can simply mount fiducial patterns at convenient locations in the environment and walk around with the helmet for the system to automatically determine the world [Xw,Yw,Zw] coordinates of each center or corner. Note that the fiducial centers are more reliably determined in varying lighting conditions than the corners, but the system will then need more fiducials in the environment.

Another optional addition is the use of an intermediate omnidirectional frame buffer (FIG. 25) which renders the entire scene in all (or likely to be seen) directions onto surfaces such as a cube, with this surface then imaged using the projection matrix calculated as described above. This, while adding a possible short delay in translation of the environment or update of game elements, reduces the orientation error to meet the 16 ms "HMD pose latency" error determined by researchers (Mania 2004, see References List below).

FIG. 19 shows basic pinhole model for a single image sensor (camera) and diagrams for converting a 3D point into a 2D point in an image. The left diagram shows one dimension, similar triangles are used to find where a point [Xc,Yc,Zc] projects onto the image plane at [u,v]. The 3D coordinates are relative to the camera and need to be converted from 'world' coordinates with the pose (position, orientation) of the camera.

FIG. 20 shows single camera equations. Notation for derivation, for convenience the image points [u,v] are converted to "ideal" image points [i,j] to remove the camera specific internal parameters. The pose of the camera in world coordinates is expressed by the 3×3 matrix R and position vector [Tx,Ty,Tz]. The "projection matrix" is defined herein as the conversion from 3D world coordinates to intermediate ideal image coordinates [i' j',k'].

FIG. 21 shows single camera DLT solution for unknown projection matrix elements given the known world and ideal image points. In this case vector V=[P11, P12, ... P33, (and optionally P34)]. Two variants can be used, either assuming $P_{34}=1$ to allow a less computational intensive solution of AX=B where X has 11 elements, or where this is not wise to assume, the second form with the AX=0 form where X has 12 elements which can be solved with the more computationally intensive singular value decomposition (SVD) method.

FIG. 22 shows multiple cameras mounted rigidly on AR/VR helmet for localization. Four cameras have their pose fixed and known as (R0,T0), (R1,T1), ... (R3,T3) in the HMD coordinate system and 7 fiducial marker centers with world coordinates [x0,y0,z0], [x1,y1,z1], ... , shown in this diagram. Fiducial markers are detected in each camera. Fiducial marker F0 is detected with image coordinates (u00,v00) in camera 0. Fiducial marker F1 is detected with image coordinates (u01,v01) in camera 0 and with image coordinates (u11,v11) in camera 1.

FIG. 23 shows multiple camera equations, shown for one camera (cam0 from FIG. 22). The camera's orientation Rcam0 and position [Txcam0,Tycam0,Tzcam0] in the HMD coordinate system [Xhmd,Yhmd,Zhmd] is fixed and known. The fiducial marker centers [u00,v00] or corners [u000, v000,u001,v001,u002,v002,u003,v003] are measured in camera0 with the world coordinates of the fiducial known (center [Xwf0,Ywf0,Zwf0]) also known. The task then reduces to finding the projection matrix [P00, ... P34] which provide the graphics mappings for AR/VR. These equations would be repeated for each fiducial detected in each camera. Each set is converted to the DLT equations in FIG. 21, as long as 6 points (such as fiducial centers or corners or bright/dark blob centers) the projection matrix can be found.

FIG. 24 shows conversion of each world reference point such as fiducial centers or corners or light/dark blob center, to 3D coordinates in the HMD coordinate system.

FIG. 25 shows optional system components: an intermediate "omni-directional frame buffer" is used to minimize latency when users rapidly rotate their heads. Graphics engine renders the entire omnidirectional view (cube version shown) of which a single perspective view is warped quickly according to the latest projection matrix or orientation to reduce the "HMD pose latency problem"

A further related addition is the repeat of this technology in a hand-held device for manipulating the environment, such as a 3D mouse or wand in a visualization or design application, or weapon in a first person shooter video game. It also has several outwards facing cameras and an orientation sensor. It may have a cable or short range wireless connection, such as "Bluetooth" to communicate its pose and action of buttons to the helmet such that only the helmet needs to communicate to a system wide management system.

The present invention teaches the combination of multiple outwards facing cameras mounted on a HMD ("inside-out tracking") or hand-held device, and fiducial markers mounted in the environment for the purposes of AR or VR. AR using single cameras and fiducials is widespread, but not in way that allows wide area practical use as per the present invention. Catadioptric cameras have been used for localization in research projects but cannot provide the high resolution imagery as the proposed set of standard cameras.

As well, the use of the DLT determination of the projection matrix instead of true pose has not been applied with multiple cameras providing a simple system that adapts without jittering pose artifacts as other 3D systems would.

Additionally, the integration of orientation sensors into a system with multiple outwards facing cameras detecting fiducial markers, to provide for times when no markers are detectable due to rapid motion, is also unique.

Overall, prior to the present invention, a wearable AR/VR helmet containing multiple synchronized outwards facing cameras, specialized hardware or firmware to detect fiducials, an on-board mini-computer to calculate a 12 (or 16 element with a bottom row [0 0 0 1]) projection/modelview matrix, and an on-board graphics system had not existed. Multi-Camera Array for Increasing Dynamic Range—with Applications Such as Spacecraft/Satellite Docking Current image sensors have a limited dynamic range of intensity, there is a relatively small range between the minimal detected lower level and maximal detected high level of light intensity. To extend this to enable markers to be detected in applications with harsh lighting with a large range between light and dark, the present invention uses an array of image sensors all aimed at the same scene, but with different iris, filters, or polarization filters mounted on each. Typically all these sensors would be placed close together to capture almost the same view. Depending on the intensity and polarization of light reflected from a marker, one or more of the image sensors will detect the marker. Sensors with a strong filter will detect the markers in bright lighting whereas sensors with a weak filter will detect the markers with low illumination, such as those in a shadow such as depicted in FIG. 26.

Figure 27:
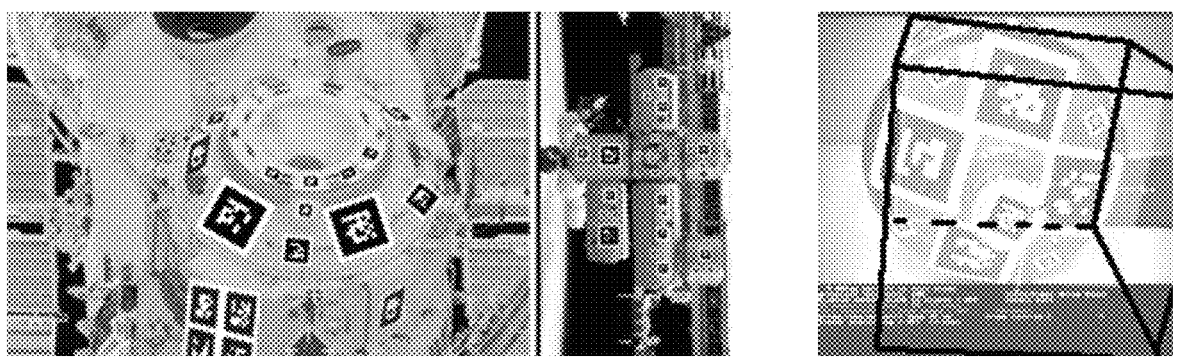
FIG. 27 shows spacecraft/satellite docking system using fiducial markers and the Multi-Camera Array invention where each camera has a different optical filter allowing the markers to be detected in the space environment with large ranges of light intensity between dark and bright sunlight.

A single unit, composed of many image sensors aimed in the same scene, but each with different light gathering capabilities can be used for spacecraft docking or satellite capture as shown in FIG. 27. The Multi-Camera Array unit implementing the disclosed MDAs mounted on one of the moving objects can calculate the relative position and orientation relative to other objects which have markers mounted on them, permitting fully automatic docking and satellite capture. Indeed, multi-camera units and markers can be mounted on all objects so that the pose information can be combined with the use of some communication system to provide a further improved measurement.

Figure 26:
FIG. 26 shows variable exposures achieved with the Multi-Camera Array invention.

FIG. 26 shows variable exposures achieved with the Multi-Camera Array invention. Depicted is images captured from a four-camera system where all cameras survey the same scene but each has a different exposure, such as can be achieved with different optical filters. This allows the simultaneous detection of markers in dark and bright lighting that is not possible with a single image sensor due to the limited dynamic range of intensity possible with a single sensor. This enables detection in extreme lighting environments such as spacecraft/satellite docking.

FIG. 27 shows spacecraft/satellite docking system using fiducial markers and the Multi-Camera Array invention where each camera has a different optical filter allowing the markers to be detected in the space environment with large ranges of light intensity between dark and bright sunlight. The left figure shows a mockup example using a space station, the right figure shows a demonstration docking system where the object's relative pose (position and orientation) relative to the camera is automatically calculated with each image frame to allow automatic docking. Following are applications of the MDAs for remote control and augmented reality applications using the markers. Hand-held remote controls typically emit infrared light in a specific pattern to a receiver which decodes them and performs the requisite function. However, to make it psychologically connected a receiver must be positioned next to the equipment of interest, however often it is not convenient to position such receivers in more than one place. With this invention one can simply place a marker, which is a simple printed pattern that does not require electrical power, and can be mounted next to the equipment requiring control instead of a location convenient for wiring reasons.

For the augmented reality applications interactive graphics are shown aligned with the objects of interest providing relevant information, the user perceives information "bubbles" over top of real world objects. These "bubbles" can contain information for logistics, and can be implemented with web browser technology or remote screen capture, or can be instructions from a remote user in a collaboration system, the following text describe these.

Logistics Application

An application of the MDAs for logistics and warehousing (FIG. 28) applications is disclosed. Specifically a system using the MDAs on mobile hand-held and wearable devices where logistical and other information is attached to markers so the information appears graphically over the marker in a live video or still image view on the mobile device with the assistance to find objects by using markers seen within the image to direct the user towards other marker(s) mounted on or near objects or locations of interest according to previously automatically learned spatial relationships, or to detect which objects are not in the correct location according to the relative position of the markers seen by the mobile device. In the former case such as a warehouse, a user types a search term or finds their desired object according to images in a program or web browser, and then is guided by graphics such as arrows towards their desired object or location, such as finding a box in the warehouse containing an item. In the second case such as a library, a librarian walks around a library with a mobile device which finds books in the wrong location due to the relative position of markers on the books. The system is also useful for the warehouse user to aim their mobile device at boxes to see an image of what is inside them (FIG. 29), or for security guards to aim their mobile device at a marker on a door to see the imagery from a video camera behind that door. This system is also useful for industrial plants where workers often spend time comparing their blueprints to the real plant to try locate components, they could simply walk around the first time with paper blueprints and capture images of sections of the blueprints, mount a marker sticker on an object such as a pipe, and then associate the camera picture with the marker, so that later users could simply aim their device at the pipe and see a picture of the blueprint relevant to the pipe. Maintenance logs and warranty and re-ordering information could also appear graphically over markers.

Figure 28:
FIG. 28 shows a warehouse example wherein markers are placed on boxes, both to associate content about what is inside, but also to provide relative position information so that a user can be guided to a specific box.

FIG. 28 shows a warehouse example wherein markers are placed on boxes, both to associate content about what is inside, but also to provide relative position information so that a user can be guided to a specific box.

Figure 29:
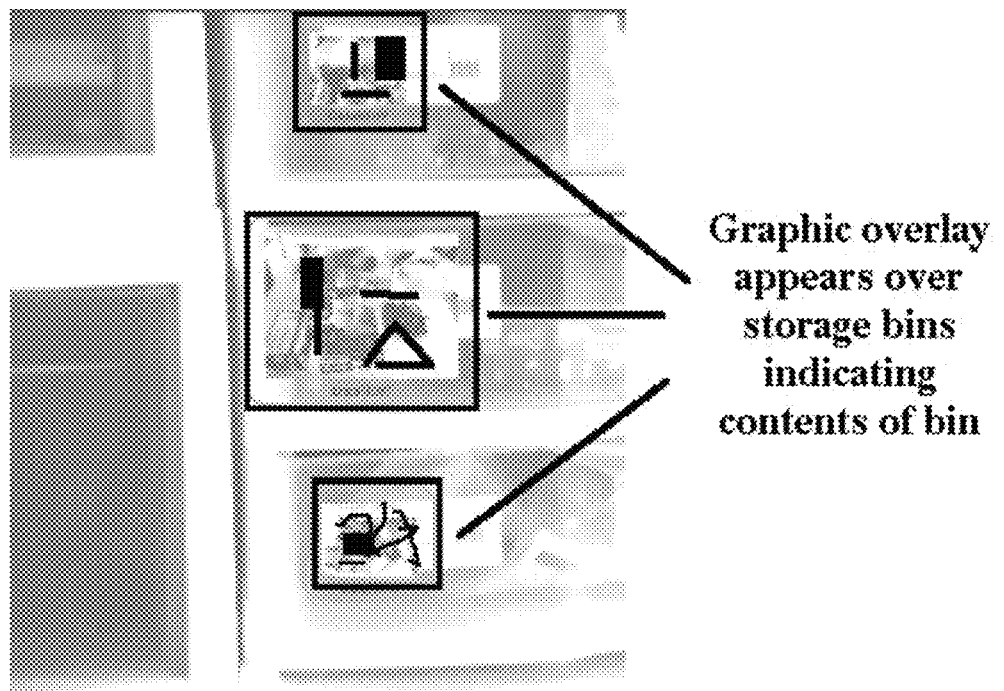
FIG. 29 shows a warehouse example with a view on a mobile device aimed at some containers.

FIG. 29 shows a warehouse example with a view on a mobile device aimed at some containers. Three containers are in view with markers attached to them. Previously captured pictures of what is inside the containers are displayed on the mobile device display over top of where the markers were detected, to allow the user to "look inside" the container.

An extension of this is a networked system where a central server provides the information to mobile devices for each marker over a wireless network. The information can be photographs taken previously by a user, audio messages, video tutorials, PDF document manuals, or current SCADA (Supervisory Control and Data Acquisition) real time information of equipment and sensor status.

The networked system would allow for the search assistance by noting automatically the latest relative location of markers to guide other users to objects. For example, a wearable AR system worn by a forklift driver, or mounted on a forklift vehicle, could be constantly detecting the relative location of markers relative to each other and reporting this to the central server. All the objects in a warehouse could be quickly and automatically indexed for relative location. Likely this relative information would not be true Euclidean positions within a single 3-dimensional coordinate system, but relative positions in groups where more than one marker was seen together at a time with no relative position information available between groups other than can be captured by other positioning means. These relative positions may only be 2-dimensional within planar sections such as warehouse rows.

Web-Browsers with Marker Detection

This describes an embodiment where world wide web technology is used to create the graphics and interactions that are used in remote control and augmented reality systems using marker and the MDAs technology.

In a typical application, users print out fiducial marker patterns on their own printer, or apply pre-printed stickers with the patterns, putting a different fiducial marker pattern on each object of interest. Then using a conventional web browser they access the switchboard interface to configure the graphics to display for each marker and set the service or database connection information. Then in day to day use, a remote control, mobile phone or tablet, or wearable device can be used to "look" at an object, see relevant real time information and execute control actions such as turning on and off lights.

At the time of this writing, AR systems are still an emerging technology and the content shown and computer programming for interaction is typically custom made for the application. Specially trained workers then must customize for changes and new content. Using the existing web leverages existing standards and accesses a wide group of content developers familiar with html, who can quickly look at their design in a normal web browser on their computer. Also, automatic attractive content can be created from a template, for example in a building each light switch will have a different name but all light switches can share the same graphical design. The process of using the MDAs and overlaying web browser content is shown in FIGS. 30 and 31.

Figure 30:
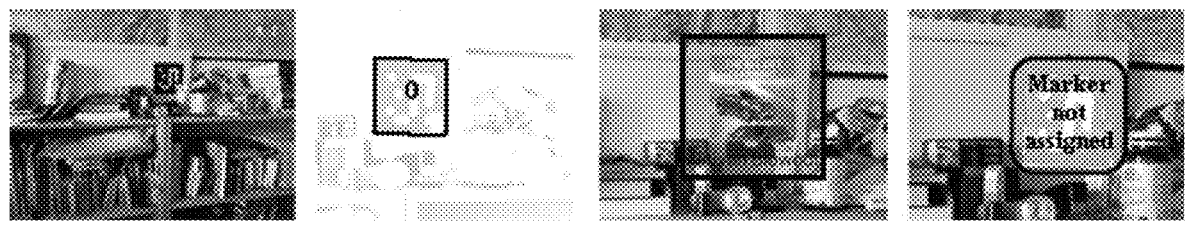
FIG. 30 shows detection of a marker and overlay of web or generic graphics.

FIG. 30 shows detection of a marker and overlay of web or generic graphics. Left to right: initial image, center of image with detected marker shown, overlay of advertisement graphic from the internet, arbitrary graphics ("Marker not assigned" text).

Figure 31:
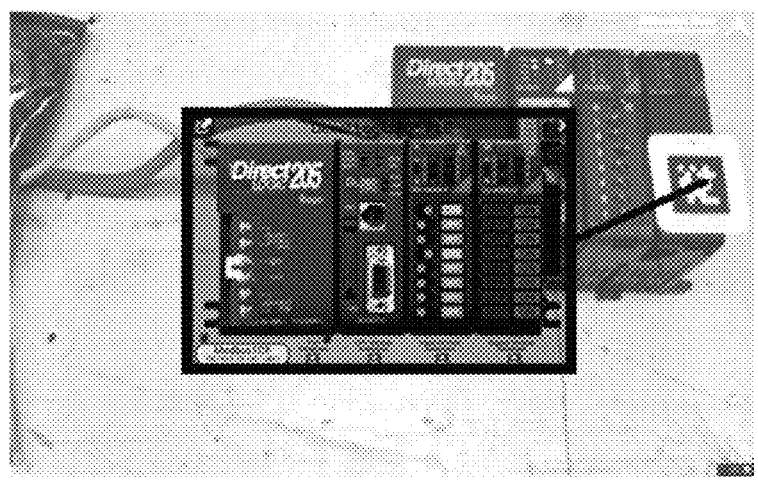
FIG. 31 shows an industrial augmented reality application using a web-browser to display a graphical interaction experience for the user.

FIG. 31 shows an industrial augmented reality application using a web-browser to display a graphical interaction experience for the user. This figure shows what would be on the display of a hand-held or wearable device. The blue graphic is overlaid over the video or still image captured from the device. In this example a blue line links the graphic to a marker to confirm to the user which machine is being interfaced to.

The interactive graphics to show the user is provided by web graphics such as html, html5, Adobe Flash®, etc. Typically the actual content creation of hand-held remote controls containing display screens and AR systems is application specific programming and graphics. Instead with this invention the creation of interactive content is accelerated using conventional web graphics and interaction primitives.

Figure 41:
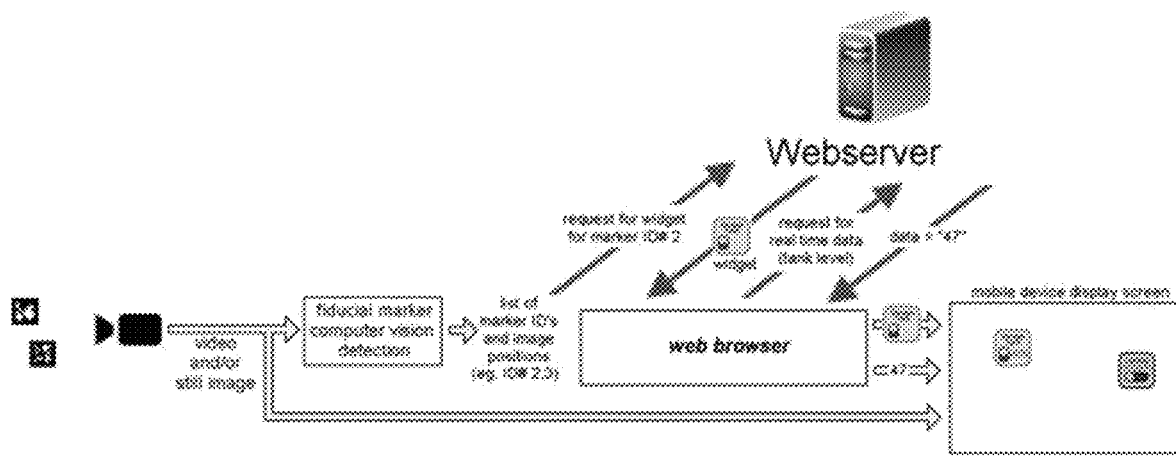
FIG. 41 shows a flow of events.

Specifically, this embodiment of this invention is of an AR system which consists of: fiducial markers placed in the environment, mobile device with a camera to see the fiducial markers, graphics display on the mobile device which shows graphics and interaction elements using a web browser, a webserver which provides interaction web pages for the interaction "widgets" to display on the mobile device, and optionally a network such as a WIFI, Bluetooth, mobile 3G data, etc for communication between the mobile device and the web server if the web server is not inside the mobile device. This process is depicted in FIG. 41. Also part of the system is the management of matching a marker to a specific web page, likely this list will exist as s list on the webserver and can be configured using a conventional web interface.

FIG. 41 shows a flow of events. Fiducial markers are detected in the mobile device's camera, markers located using computer vision algorithm, requests are made to webserver according to marker ID's, widgets are sent back (most likely composed of HTML) and interpreted by the web browser. The widget contains executable code (most likely JQuery calls such as AJAX and POST in javascript) which requests data from services in the webserver, such as the height of a storage tank in this example, and sends control instructions such as turning on and off a light, or changing a motor speed. The widget with the correct data is now drawn and displayed to the user who sees the blue tank level widget by fiducial marker ID #2 and the grey on/off widget next to fiducial markerID #3. The "switchboard" (not shown) resides inside the webserver computer system and routes the requests to the appropriate industrial protocol service or database.

The placement of one or more web browsers over a live video feed or in the eyepiece of a wearable computing system, the positions of said browsers which change with that of detected markers, allows for a generic system that can be easily customized by changing content in a remote web server without changing the system.

Figure 39:
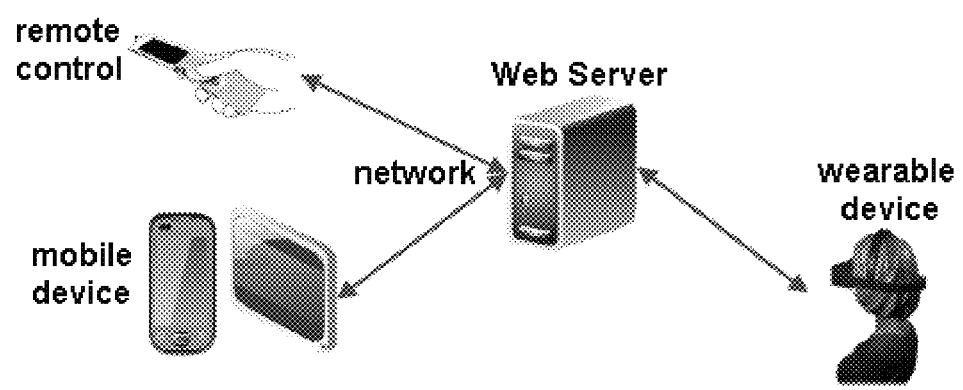
FIG. 39 shows a web-server providing widgets to a user device.

A further aspect of the present invention is a computer data visualization and control system where graphical interaction graphics (called "widgets" herein) are downloaded to a mobile device from a webserver, rendered on the mobile device using one or more web browsers. Fiducial markers are affixed to objects and recognized in video and still image imagery from the mobile device's camera, each of which fiducial marker contains a unique ID which refers to a given widget. FIG. 39 shows how this widget can be used on either remote control devices or mobile devices. FIG. 39 shows a web-server providing widgets to a user device. Widgets are in existing web formats containing both graphics and interaction elements.

Figure 40:
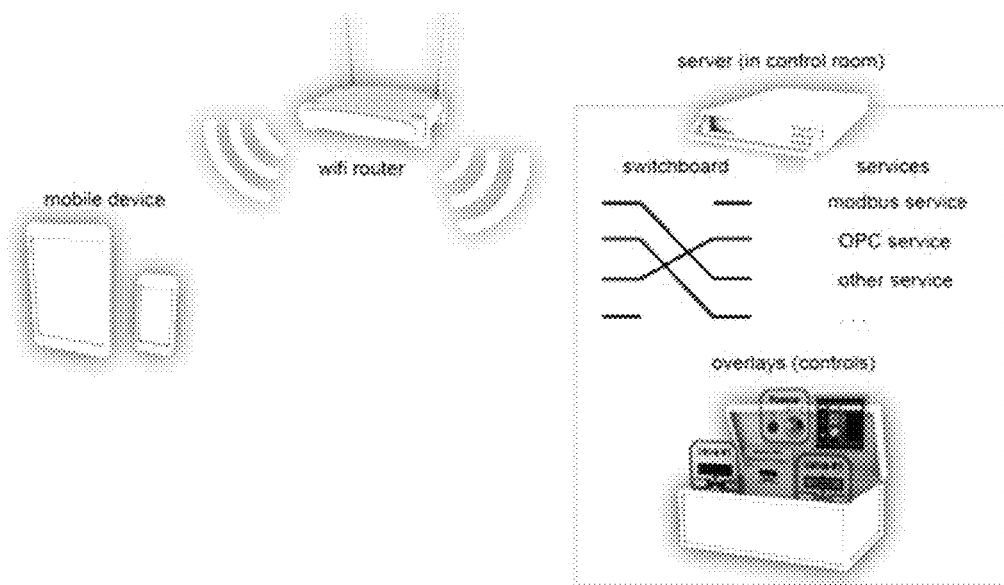
FIG. 40 shows industrial AR system example.
Figure 42:
FIG. 42 shows a view of a "switchboard" web server configuration page.

A fundamental component is a mapping between marker unique ID's (from their interior digital code) and a URL web address. This URL address can be an address on the world wide web, or in a preferred implementation this is an address to a local server which returns the widget and optionally connects to a "service" such as a light switch or registers inside an industrial SCADA system or to information inside a database. FIG. 40 shows the server supplying "widgets" (labeled as overlay/controls) and a connection to one of several "services" controlled by the "switchboard". The same "widget" can be used with several markers but can each connect to a different service, such as the application of turning on and off light switches, the same graphical widget, probably in the form of a web-page, could be re-used for each light but each would display a different label and control a different switch. This is the "switchboard" functionality, where communication between web pages running on one or more web browsers on each mobile device and the source of information or recipient of control actions. For industrial systems this information and control would be managed by a "service" for each industrial protocol, such as Modbus (® Schneider-Electric) or an OPC (® Matrikon) server. In one form of implementation this switchboard functionality is managed by the webserver as well. For database driven applications, this information and control is the access to specific parts of a database, such as maintenance logs, blueprint data, bathroom cleaning logs, library books, etc. As stated, the URL address may, or may not, be on the actual internet but will most likely be on an internal network. FIG. 42 shows a view of a "Switchboard" web server configuration page. Each marker ID (eg. 11, 12, 13) is attached to a graphics 'widget' which provides the graphics and a 'service' which provides the real time data such as flow rate. Note marker ID #12 is connected to the flow rate widget shown in FIG. 43 (right). FIG. 12 shows the flow rate widget drawn over top of a video or still image for an augmented reality application on a mobile device.

FIG. 40 shows industrial AR system example. A webserver sends overlays (widgets, controls) to a mobile device. The system has a set of basic widgets that the system designer chooses from. The designer also configures each widget to connect to an appropriate "service". Modbus and OPC are examples of industry standard interfaces which have software called services implementing them. The services communicate through the switchboard to send and receive information and control actions between the industrial system and the web browser(s) running in the mobile device. The switchboard performs the dual task of sending the control overlay widget graphics to the mobile device, and possibly interaction software program, to the mobile device according to the detected marker, and the second task of relaying data requests and responses between the mobile device and the services. A different service would likely be created for each type of system being communicated with.

FIG. 42 shows a view of a switchboard web server configuration page. Each marker ID (e.g. 11, 12, 13) is attached to a graphics widget which provides the graphics and a 'service' which provides the real time data such as flow rate. Note marker ID #12 is connected to the flow rate widget shown in FIG. 43 (right).

Figure 43:
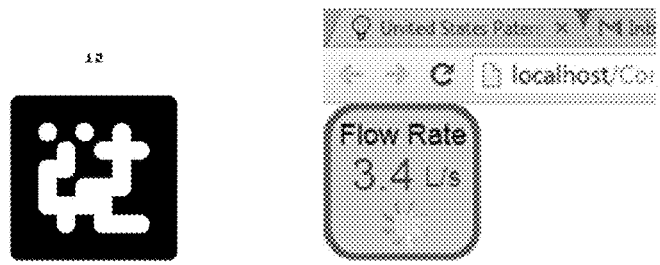
FIG. 43 shows a sample fiducial marker the left, while the right shows a widget viewed in a conventional web-browser.

FIG. 43 shows a sample fiducial marker #12 on the left, while the right shows a widget viewed in conventional web-browser. The right widget is assigned to fiducial ID #12 and is presented by a web-server when queried for the marker ID.

FIG. 41 depicts the flow of events where the widget is a webpage running in a web-browser which calls information from a "service". Fiducial markers are detected in the mobile device's camera, markers located using computer vision algorithm, requests are made to webserver according to marker ID's, widgets are sent back (most likely composed of HTML) and interpreted by the web browser. The widget contains executable code (most likely JQuery calls such as AJAX and POST in javascript) which requests data from services in the webserver, such as the height of a storage tank in this example, and sends control instructions such as turning on and off a light, or changing a motor speed. The widget with the correct data is now drawn and displayed to the user who sees the blue tank level widget by fiducial marker ID #2 and the grey on/off widget next to fiducial markerID #3. The "switchboard" (not shown) resides inside the webserver computer system and routes the requests to the appropriate industrial protocol service or database.

Three embodiments of the system using three different mobile devices are described. The mobile computing devices are: 1) a remote control device with display screen and outward facing video camera (as in FIG. 10), 2) a consumer phone or tablet device (as shown in FIG. 11 left), or 3) wearable mobile devices worn on the user's head (as shown in FIG. 11 right). The first embodiment of a hand-held remote control is used to control equipment, a user points it at a marker positioned close to the object it controls (such as a light switch) and a menu appears on the display screen providing information and control inputs. The second and third embodiments are augmented reality systems where users see the computer generated graphics which appear to be connected to real world objects. The graphics contain useful information about the objects, such as temperature and pressure readings in an industrial setting, the destination and contents of a box in a warehouse, or the price of an article in a store. In some applications the user will also control equipment or change database information, such as turning on or off a light or updating a service log. In the first embodiment of the present invention the web page is simply displayed on the remote control's display screen. In the second and third embodiment augmented reality is implemented: the graphics are shown in a moving virtual web browser window positioned over one or more detected markers. This virtual web browser window is placed over a live view and a 'widget' appears (a sample display screen example shown in FIG. 31) which is written in html or other web standard languages. In all three cases the widget content is downloaded from a conventional web server onto the mobile device, and displayed over the detected position of a 2D printed marker.

FIG. 10 illustrates the 1st embodiment of the mobile device component of the system. A hand-held remote control device contains an outward facing video or still image camera, computer vision processing algorithms to find fiducial markers in this imagery, a management system which relays these detected marker ID's to a webserver, and a display device whose content is generated with a web browser. A micro-computer could implement the marker detection with software algorithms and the web browser. Optionally special processing hardware such as FPGA's, ASIC's, or DSP's could perform the computer vision processing to find the fiducial markers to improve speed and reduce the requirements for the micro-computer. Network connectivity is necessary, most likely WIFI, Bluetooth, data over a cellular phone network such as 3G, or other wireless communication like Zigby. The display in one embodiment shows different information depending on which, if any, fiducial marker the remote is being aimed at. The display could show relevant information such what equipment is currently being communicated with. The remote control in one embodiment contains buttons whose functionality may change, or the display itself would be a touch sensitive display so that virtual buttons would appear. A typical application could be in a "smart building" to control lights, HVAC (Heating, Ventilation, Air Conditioning), control door locks, open window blinds, etc. A laser pointer may be built into the remote control so that the user can specifically aim the laser dot at a fiducial marker to select it since the center of the image sensor's field of view is not as easy to determine.

FIG. 11 illustrates the second embodiment of the mobile device component of the system where a mobile phone or tablet is used instead of the custom made remote control device of FIG. 10. In this way the 2nd embodiment can be implemented fully in software. Similar to the remote control device of FIG. 10 the phone or tablet contains an outward facing image sensor, a micro-computer, The user would run an "app" which is a program that operates an outward facing camera, processing the imagery to find fiducial markers, requests content from a remote webserver, and implement one or more web browsers to display the widget and handle its interactions. Network capability such as WIFI or others listed above is part of this device in one embodiment. Three key difference from FIG. 10 is that the display: 1—contains both the camera imagery and the widget(s), 2—there is possibly more than one widget displayed, and the positions of the widget(s) changes in accord with the image position of the fiducial marker in the image unless that widget is in a "full screen" mode. Therefore the second (and third) embodiment is true augmented reality (AR). The second embodiment differs from the third in that it will be easier for control actions since the user can easily touch the screen. A wearable device worn on the head may not have as many input control options.

FIG. 11 (right) illustrates the third embodiment of the mobile device component of the system where a wearable system is used to experience the AR effect instead of a hand-held device. The mobile device has the same system components of video (or still image) camera, display, micro-computer, one or more web browser(s) and a display screen. Similar to the 2nd embodiment the functionality can be implemented fully in software as a mobile "app". The display screen for the wearable could be a single eyepiece display or stereo display providing imagery to both eyes. Likely for an industrial application the worker needs their normal full vision and only wants this system to provide some information and so there would be sparse amounts of visual information presented. The display in one embodiment could be "optical see-through" where the display is transparent, does not show the video camera image, and only a few pixels become opaque. Alternatively, the display could be "video see-through" showing both the camera imagery and the overlaid widgets, i.e. the same as the 2nd embodiment but in the eyepiece display. For minimum discomfort a single eyepiece display extending from a hardhat could be the best configuration. The Google Glass® is one example of such a wearable system. The advantage of the wearable system is that (with sufficient battery capability) it could always be operational and provide information passively, meaning that the user can detect events and information without first intending to find such information. For example, a flashing red widget over a machine warning of an error condition could be seen as the user walked by not originally thinking about that machine. Information could stream into the worker's mind in the form of small graphics conveying only small bits of summarized or important information. This is an advantage over the 2nd embodiment, that of the hand-held device, in that for the hand-held devices the user has to first consciously want to see some information and then run the app on the device, and aim it at the object of interest. The disadvantage of the wearable device is that it is harder to issue command instructions. Wearable devices typically only have a small number of gestures, taps, or swipes that can be done with the finger on the device. A possible solution is that the user also carries a remote control (1st embodiment) or mobile device (2nd embodiment) which they take out and use if they decided to issue some commands, or the user could use hand-held fiducial markers to make gestures with that are seen with the wearable device's camera. In this configuration the wearable device only accesses information in a "read only" paradigm. Another disadvantage of wearable devices is the differing fields of view of camera and display as addressed in FIGS. 45, 46 and 47.

In remote control devices (embodiment #1) it is useful, although optional, to have the remote control function for controlling a variety of different machines or input to a computer, for example the same remote control could be used to control room lighting, turn a fan to a different speed, turn on or off some industrial machinery, change channels on television, or interact with a kiosk at a conference. In this aspect of the invention a fiducial marker is placed on or near each object that interaction is desired with, and an interaction control widget is downloaded from a server computer. Specifically, in this aspect, the broad existing work of interfaces for the world wide web would be leveraged and so this server would be a web server. The remote control has a display screen and some input capability such as the display being touch sensitive or separate inputs such as buttons, joysticks, sliders, etc. In many applications the remote can simply have only a touch sensitive display so that the user can touch directly on the graphics. Depending on the device being controlled, a different control interface will appear. An application could be a hospital where staff control lights, fans, door locks, and other equipment using this remote control. This control could be performed without having to enter infected areas or touch possibly infected surfaces or objects such as light switches, the control can even be done through a window without having to enter a room. The staff would aim the remote at a fiducial marker located on or near the device being controlled, a different menu (widget) will appear on the display depending on the device. For this system the devices such as the lights, etc must be controlled from a computing device somewhere that is attached to a network that the remote can access wirelessly.

The $2^{nd}$ and $3^{rd}$ embodiment of this invention are augmented reality (AR) applications where the same system components exist as in the $1^{st}$ embodiment except that the user experiences the illusion of the control widgets being over top of the markers through either a video see-through or optical see-through AR configuration. The $2^{nd}$ embodiment of this invention is with tablet or 'smartphone' mobile phone devices, or custom devices of similar design with a display screen and outwards facing image sensor. Most likely this $2^{nd}$ embodiment is implemented as mere software on a consumer mobile device such as an iPad® (Apple Inc.), a Samsung 8 Galaxy® tablet running the Android® (Google Inc) operating system, or a smartphone such as an Android® or iPhone® (Apple Inc) mobile phone since they contain all the necessary components of outwards facing image sensor, user facing display screen, a micro-computer with webserver and a wireless interface such as WIFI® or data over the cellular mobile phone network (eg. 3G networks). The $2^{nd}$ and $3^{rd}$ embodiment of this invention are augmented reality systems in that they provide the information and possible interaction graphic (called a 'widget' herein) that appears to be in the same place or direction as the physical object. With the $2^{nd}$ embodiment the display is typically not transparent and so the display would show the video or still image captured by the outward facing image sensor, and this video or still image would have a widget displayed on top aligned with the position of the fiducial marker as detected in the image. In the typical expected case, that of real time video being captured by the image sensor, the widget would appear to belong to the physical scene as that it moves on the display in a way consistent with the motion of the device. The effect is similar to the mixing of computer graphics and real film footage in the movie industry, the computer graphics is drawn in a way to be consistent with where it would be seen if it was a real object in the scene. The $2^{nd}$ embodiment would typically have a touch sensitive screen, as found in consumer tablet or mobile phone devices at the time of this writing (2014) which would allow possible control actions by the user. The $3^{rd}$ embodiment is a wearable device which may or may not have control actions possible since it would be difficult for user to interact with the device, unless it was paired with a hand-held electronic device or hand-held fiducial markers also detected by the wearable device's camera. The wearable device could be an optical see-through AR system where the display would not show the camera image as in the suggested implementation of the $2^{nd}$ embodiment (tablets and mobile phones) but would instead show only the widget graphics.

In both embodiments the widget graphics are shown in a way that is intuitively obvious to the user that they belong with a physical object in the environment. In the simplest case the widget is drawn so that its center is at the same location in the image as the projection of the center of the fiducial marker. In a more usable system, the position of the widget would not exactly follow the image position of the fiducial marker in order to reduce the shaking of the graphic making it hard to read as the user's hands will likely shake holding the device. Also, with several fiducial markers, the widgets may overlap too much and provide too much visual clutter and so they may be drawn in different positions not exactly over the fiducial marker image location so as not to overlay, but would have some way to associate them with their corresponding marker, such as a line or arrow connecting the widget to the center of the marker. This could be described as the widgets being "bubbles" or "balloons" gently pushing each other out of the way so as not to overlap.

Aspects of the present invention combine object recognition using fiducial markers with existing graphics and interaction mechanisms designed for the world wide web to provide intuitive remote control and augmented reality interactions. The object recognition is achieved with computer vision processing of images on a mobile device to detect specially printed marker patterns. Graphical "widgets" allow both data visualization and control functions. The use of fiducial markers allows for the automatic selection of what information and control interfaces to provide. The use of conventional web graphics allows for easy creation and modification of interfaces, and the simple provisioning of graphic types and interfaces to equipment control and databases.

A specific possible implementation and architecture using the web technology at the time of this writing is disclosed. Using HTML javascript executable code within the widget to provide procedurally generated graphics, animations, and active updating of information using JSON coding, communicated with Ajax and HTTP POST operations, and the routing of these messages to equipment or database services using a model-view-controller architecture in the webserver is one manner of implementation.

Figure 44:
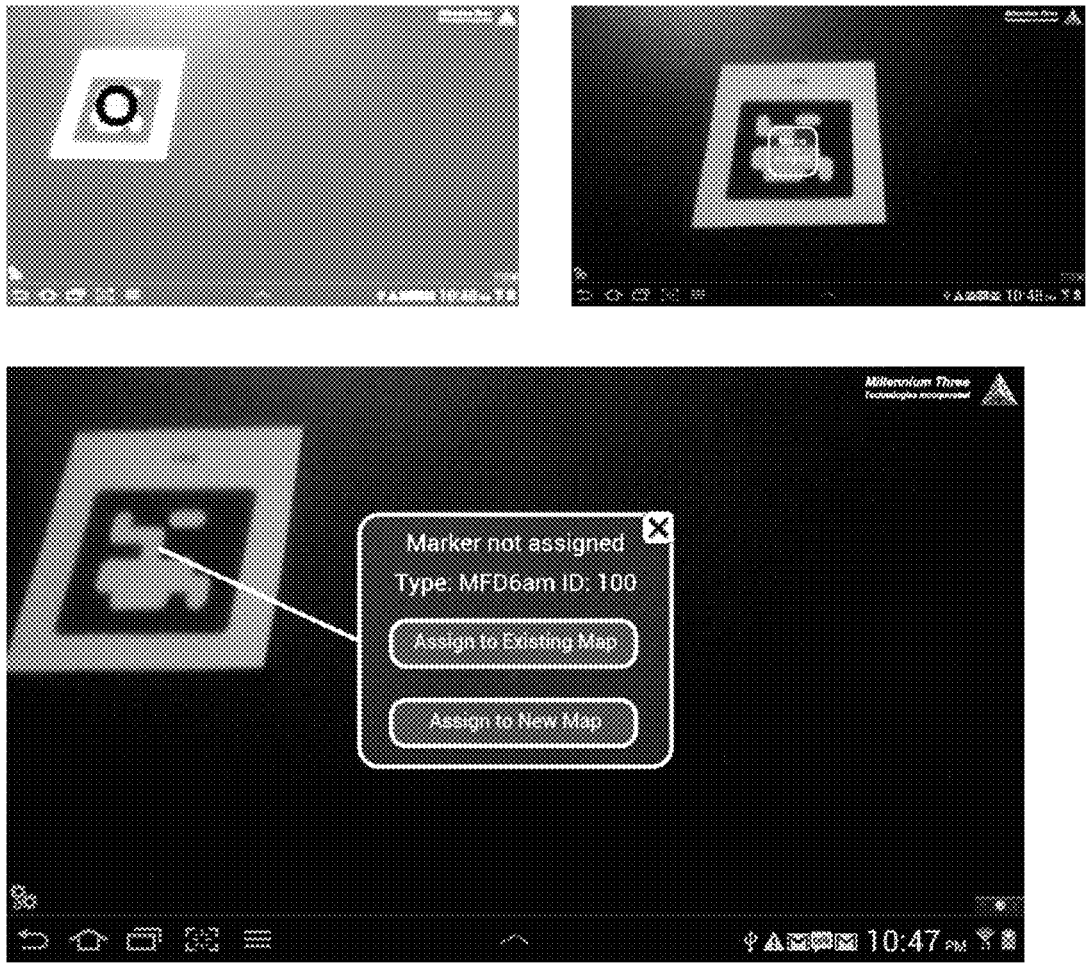
FIG. 44 shows a widget interface for assigning markers that are not yet associated with a widget and service.

Useful additions are for handling un-assigned markers, the "age" of data, and handling devices with differing camera and display fields of view. The default widget that appears for markers whose ID number (and optionally marker family) have not been assigned to a function. FIG. 44 describes the default graphic that appears and a web interface it can launch to allow the user to select from sets of graphics and service elements that have no marker association. For assigned widgets with data whose age is important, a clock-like graphical add-on appears on widgets indicating how old the data is (FIG. 48). For wearable devices such as the Google Glass™ the video camera captures a much larger part of the user's field of view than the eyepiece display occupies, the challenge of representing this information for augmented reality is addressed with the technique shown in FIGS. 45, 46, 47.

FIG. 44 shows a widget interface for assigning markers that are not yet associated with a widget and service. The "Marker Not Assigned" widget is first shown as a small icon if it is in the periphery of the view (upper left). The widget then grows larger to the medium size when it is closer to the display center (upper right). In a working prototype system the widget is grey. The small and medium size widgets follow the marker. When the user taps it the widget moves to a fixed spot in the center of the view and enlarges (lower left). A line that extends from the widget border to the marker center assuring the user of what marker is being associated. The large widget offers two options for "Assign to Existing Map" or "Assign to New Map", as well as a cancel function with the red cross icon. If the user taps on the "Assign to Existing Map" or "Assign to New Map" buttons the application exits and takes the user to a conventional web-browser (lower right) for more convenient interaction. In the lower right image the user has a list of control widget and service connections. The first entries are those without a marker association, then are a list of already associated sets of control widget, service, and marker should the user wish to replace a marker.

Figure 35:
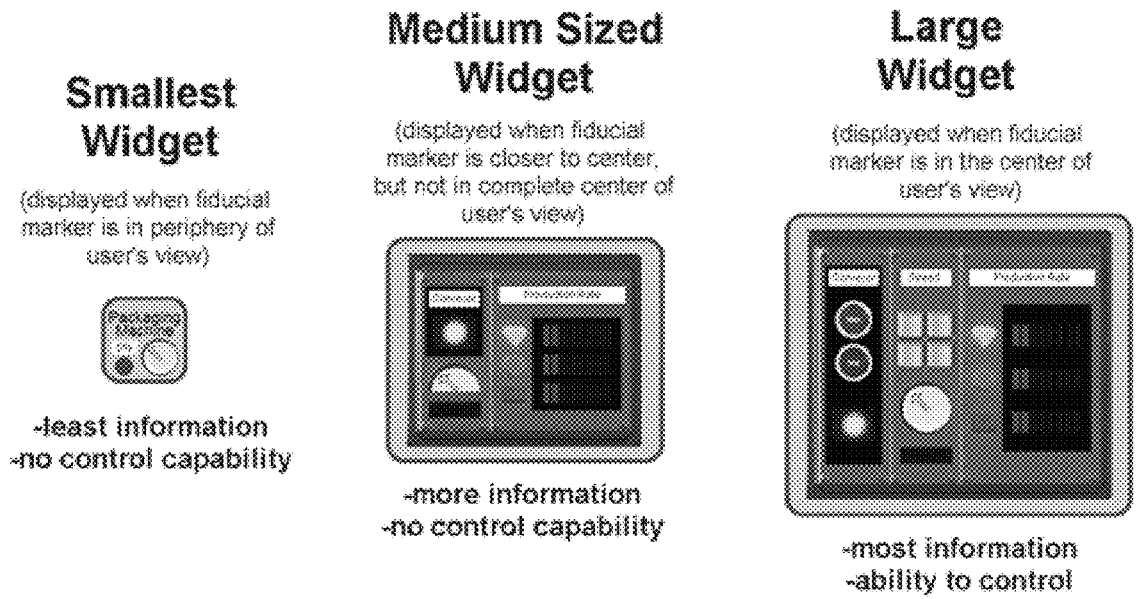
FIG. 35 shows widget display size.
Figure 36:
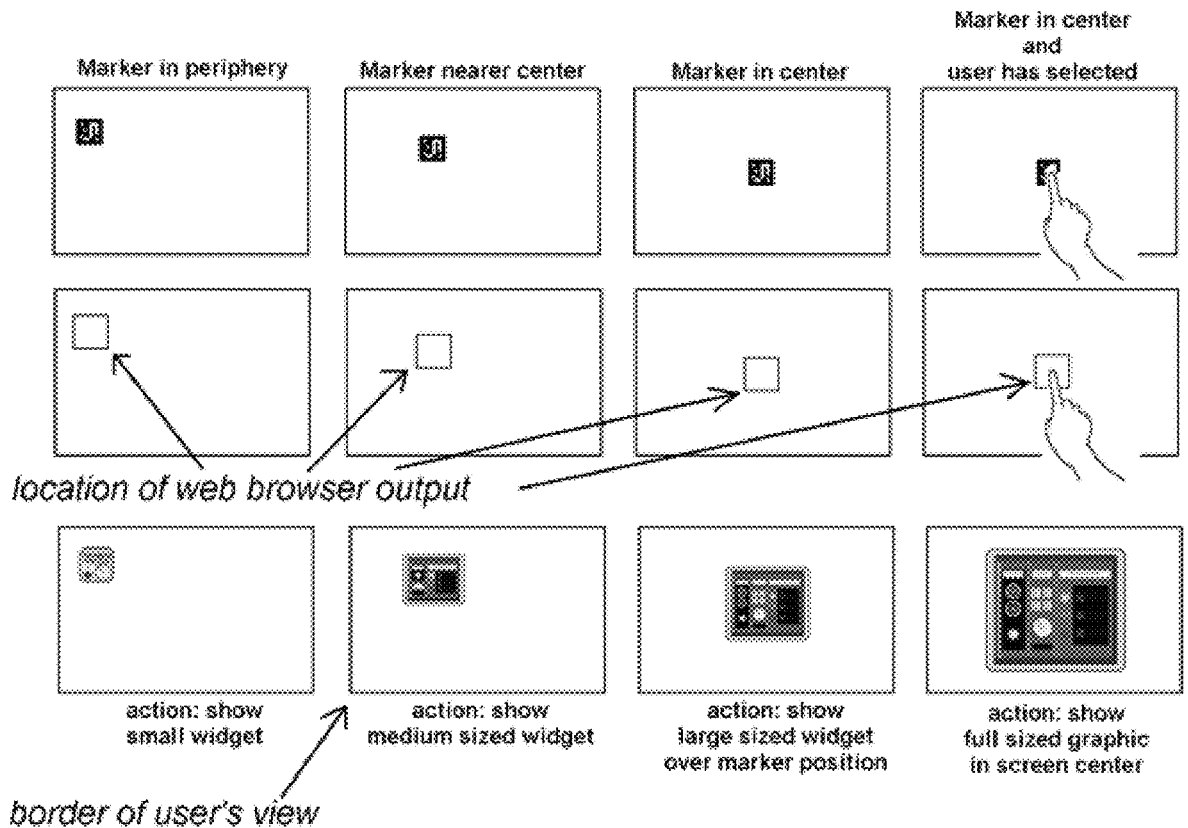
FIG. 36 shows suggested interactivity of widgets for 2nd and 3rd embodiment to match user's attention.

The size and location of the widgets can be made to depend on the location in the user's field of view, and whether the widget has been selected by the user or not. Smaller widget sizes show less information but occupy less display space. FIG. 35 shows a preferred setup where there are three different sizes of the widget to be drawn, furthermore the graphics for all three can be combined into a single web page widget so there is no delay in loading as the device changes the desired drawing size. FIG. 36 shows the how the location of the detected marker in the camera image, and whether it is selected or not, affects the size of the screen given to the web-browser to draw its content and what size it is told to draw at.

Figure 32:
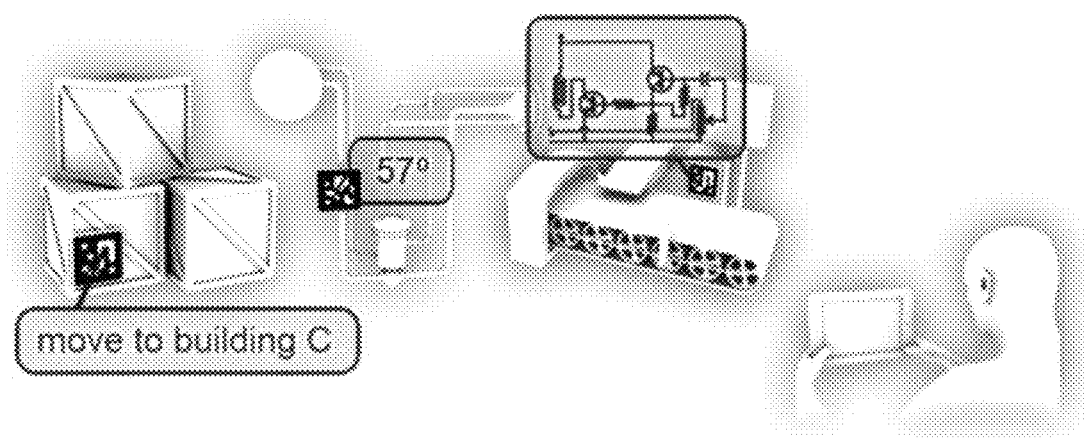
FIG. 32 shows an industrial augmented reality application visualization.

FIG. 32 shows an industrial augmented reality application visualization. Logistics data (left), sensor data (middle) and manual, blueprint, schematic information available (right) are shown in the visualization. Users see information such as logistics and control information that appears to exist near relevant objects. This illusion is achieved by placing 'widgets' so they appear close to the relevant objects from the user's point of view. Industrial systems such as SCADA industrial automation and logistics applications such as warehouse applications are shown.

Figure 33:
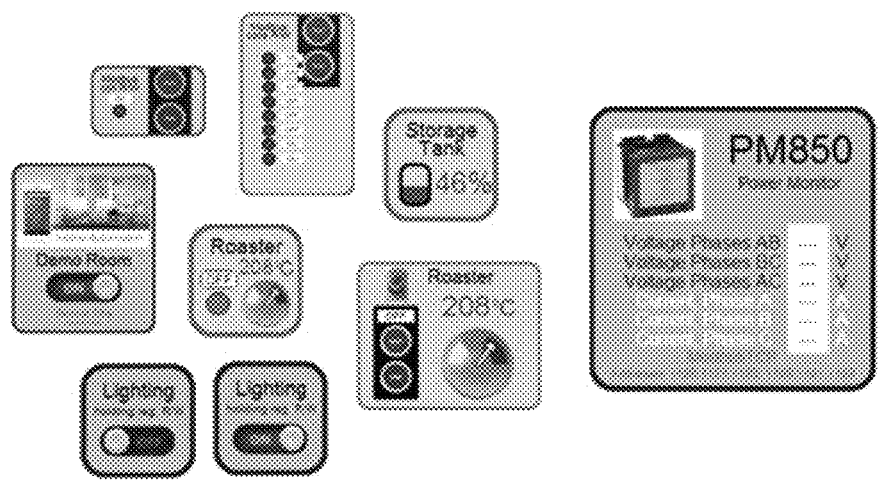
FIG. 33 shows examples of widgets generated using web browser graphics.

FIG. 33 shows examples of widgets generated using web browser graphics.

Figure 34:
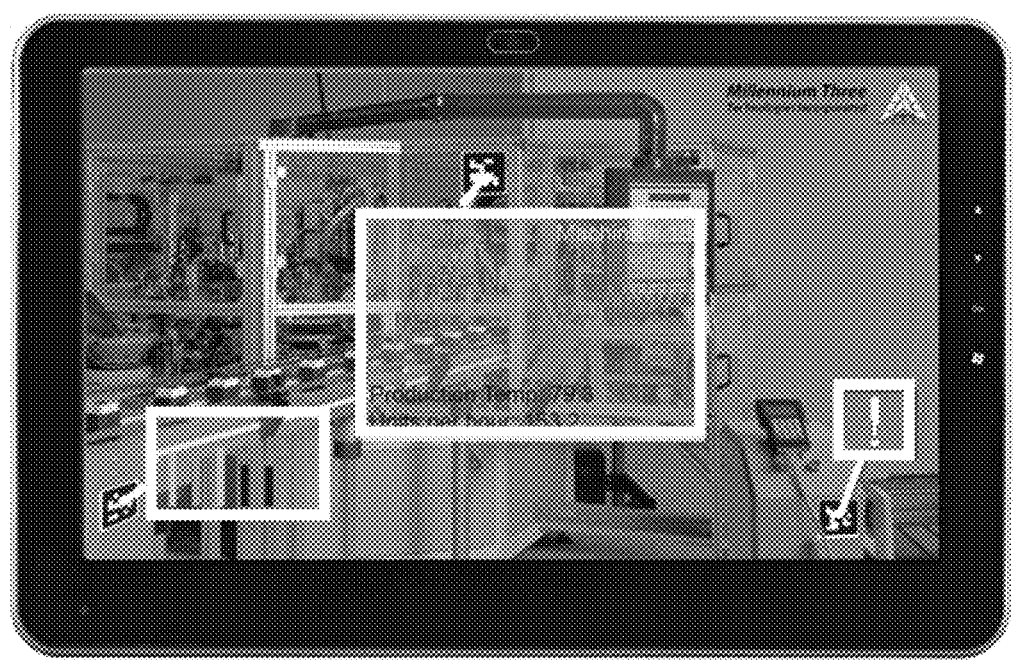
FIG. 34 shows three augmented reality shown in a single image, each is a separate web browser, or virtual web page within an html IFRAME tag.

FIG. 34 shows three augmented realities shown in a single image, each is a separate web browser, or virtual web page within an html IFRAME tag.

FIG. 35 shows widget display size. Depending on where the marker is in the user's field of view, the widget is displayed at a corresponding size.

Figure 37:
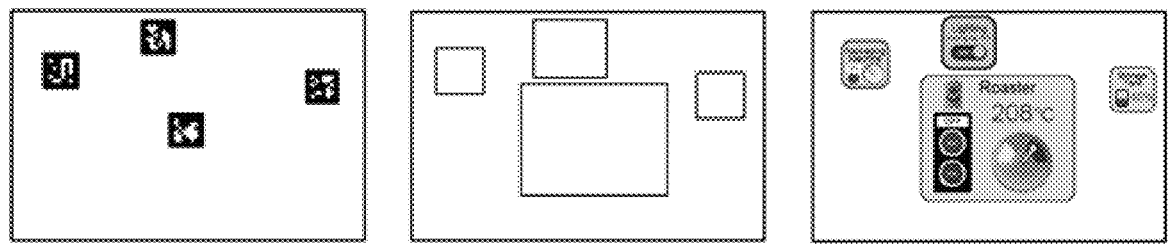
FIG. 37 shows the case of multiple markers in view of the mobile device's camera that correspond to visible places in the display screen.
Figure 38:
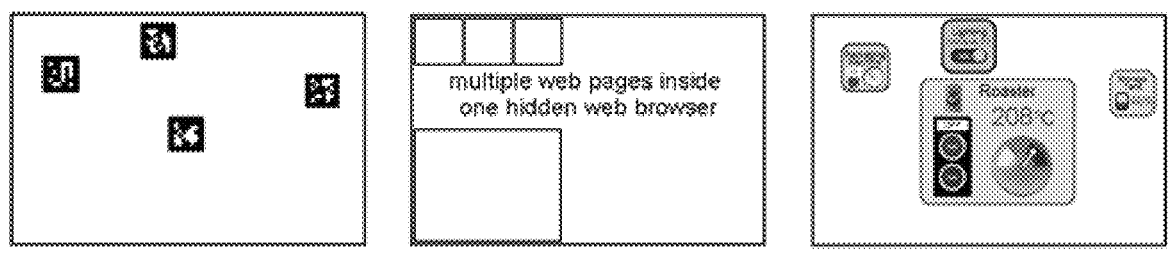
FIG. 38 shows another implementation of multiple web pages using a single web browser.

How the system is designed to handle the motion of the widgets is shown in FIGS. 37 and 38. FIG. 37 shows how each widget is given its own web-browser, which consumes more memory and CPU resources but is simpler to implement, a different web browser is placed over each marker location. FIG. 38 shows a slight refinement where a lower number of actual web browsers are requested from the operating system but the output graphics and interaction touch events are copied to and from positions over top of the display. In FIG. 38 the three small widgets are all drawn with one web browser drawn to a hidden area, but their output graphics are copied over to three separate locations in the display image. Likewise, interaction events like screen touches over the three different display locations are transferred back to the corresponding part of the hidden single web browser to invoke the appropriate response. Multiple widgets can be drawn with a single web browser using primitives such as html IFRAME or DIV to contain many pages within one page. The purpose of this complexity is for systems such as some earlier versions of the Android® and iOS® mobile operating systems that limit the number of web-browsers that can be requested from the operating system, which in some cases can be less than the number of detected markers.

FIG. 36 shows suggested interactivity of widgets for 2nd and 3rd embodiments to match the user's attention. The rectangular border represents the user's field of view, which is the display screen in the 2nd embodiment. The widget from the web browser is drawn over the marker in the 2nd embodiment, or in the direction of the marker in the 3rd embodiment. As the marker moves closer to the center it becomes larger. When selected it becomes a large or full screen graphic in a fixed position. Control actions, such as turning on and off equipment, would typically only occur in the (large) rightmost or 2nd to rightmost (full screen) modes to prevent accidental operation.

FIG. 37 shows the case of multiple markers in view of the mobile device's camera that correspond to visible places in the display screen. This diagram depicts multiple web browser windows, one placed centered at the location of each marker. Each web browser draws the content of an individual web page sent by the server. Alternatively, the different windows could be embedded web pages inside a single fixed browser window, using primitives such as html IFRAME or DIV to contain many pages within one page. The virtual windows would have to move and possibly appear/disappear as markers change in each input image frame.

FIG. 38 shows another implementation of multiple web pages using a single web browser. The web browser contains multiple web pages within one larger page, this content is rendered to a single hidden page that the user does not see, and sections copied and placed over the correct locations within the display visible to the user. This method is useful for the case where the web browser uses up a lot of computer resources on the mobile device and it is not efficient or possible to have many independent individual web browsers.

Figure 45:
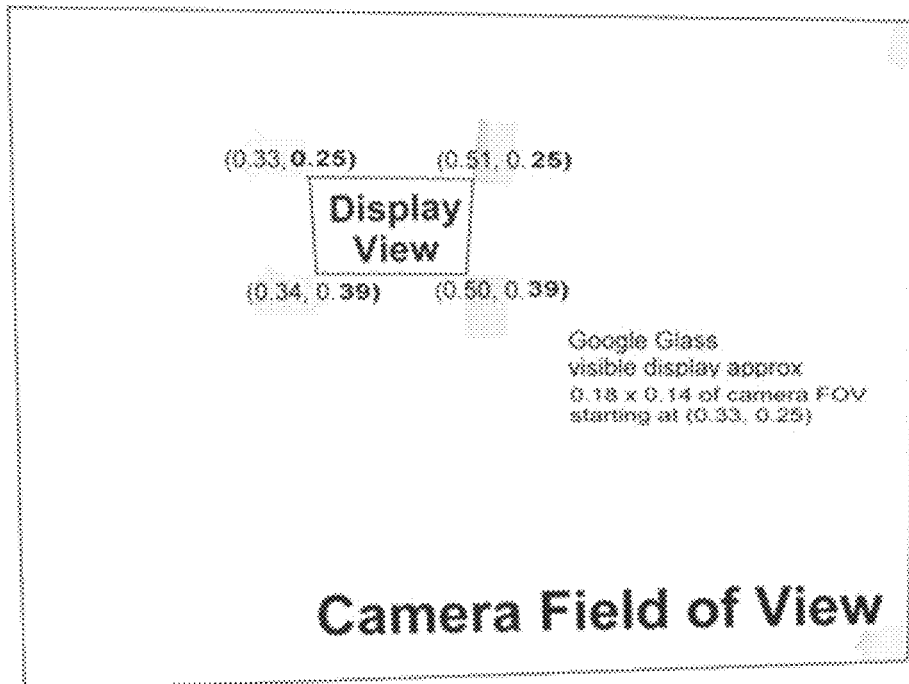
FIG. 45 shows implications of the difference of camera and display field of view for wearable augmented reality devices.

FIG. 45 shows implications of the difference of camera and display field of view for wearable augmented reality devices. A prototype of the 3rd embodiment was implemented using the Google Glass (R) wearable device which has a much smaller field of view for the display compared with what the wide angle camera can see, as perceived by the point of view of the human's eye. The outer "Camera Field of View" box shows what the camera on the Google Glass captures, the much smaller box titled "Display View" shows what part of this view the user sees. This large field of view for the camera is helpful in that it allows markers from a large direction range to be detected. However, the system should somehow indicate information from markers that are outside of the display range.

Figure 46:
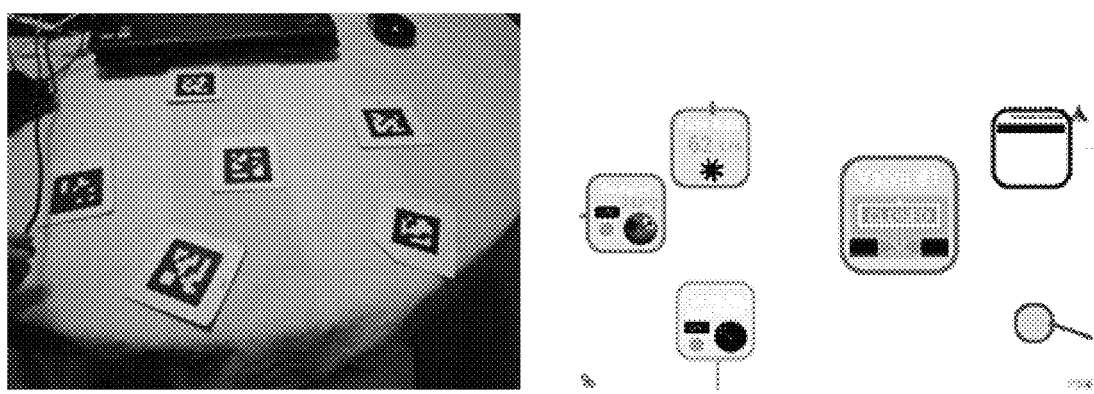
FIG. 46 shows example of augmented reality view perceived by user using wearable display.

FIG. 46 shows example of augmented reality view perceived by a user using a wearable display. The left image shows a large field of view image captured by the wearable device's video camera. The right image shows the "control widgets" displayed. Referring to FIG. 45, only the center marker is within the field of view covered by the display, this marker is associated with the "Valve #1" control widget. Only the center marker is the larger widget in the right image and all the other widgets are smaller and have lines emanating from them towards their associated markers. Only the right image is shown on the semi-transparent display, the camera view is not shown on this "optical see-through" system. The black part of this display image (right) is the most transparent. The effective view that the human eye sees is shown in FIG. 47.

Figure 47:
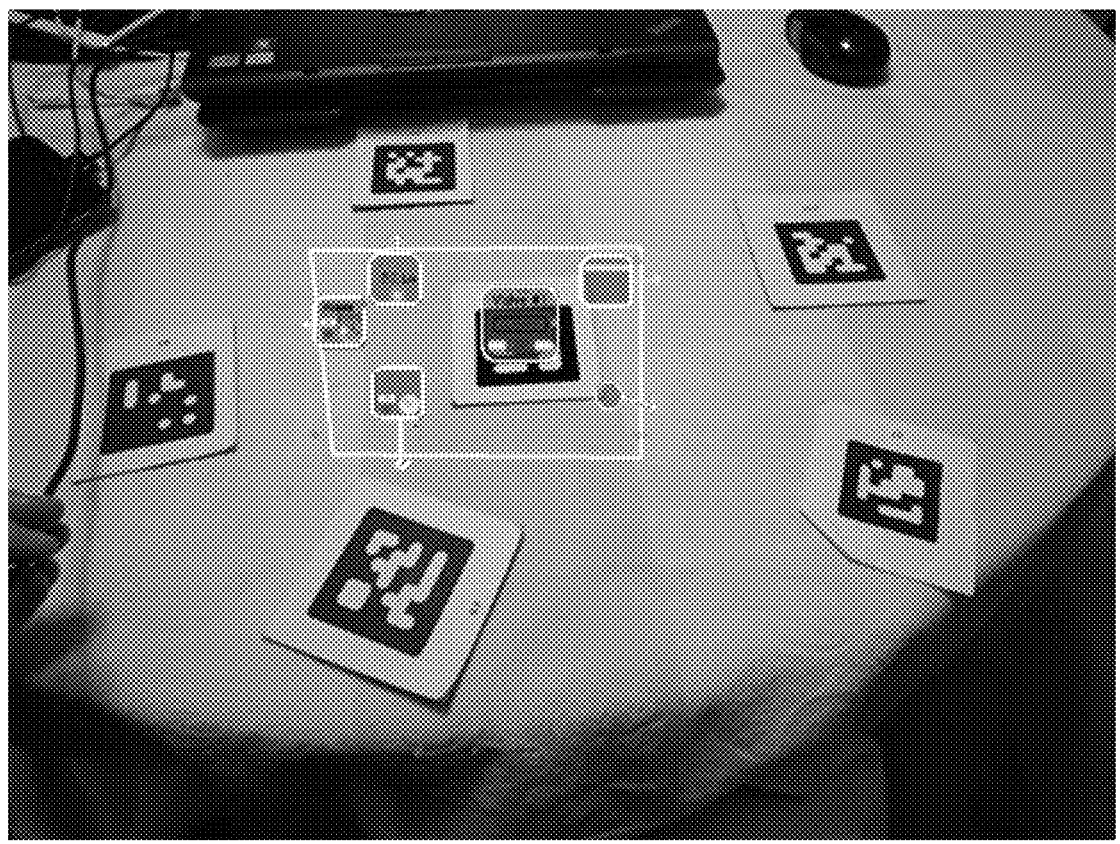
FIG. 47 shows a view experienced by user using wearable augmented reality system, in this case a Google Glass wearable device operated in "optical see-through" mode.
Figure 48:
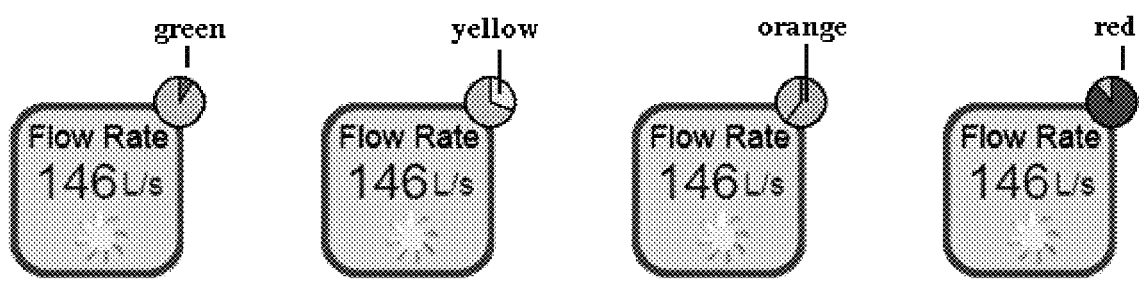
FIG. 48 shows a visual indicator of how old data is.

FIG. 47 shows a view experienced by a user using wearable augmented reality system, in this case a Google Glass wearable device operated in "optical see-through" mode. The white quadrilateral is not visible and only shown to demonstrate the small field of view the eyepiece display occupies in the user's view. The system shows control widgets over markers that lie within the angular field of view of the display. However, this is not possible for markers detected by the wider field of view camera and so the control widgets are shown at half size at the edges of the display region with lines or arrows pointing towards their markers. In this way a user can be alerted of some information and can turn their head towards it to see more. In this implementation only small size widgets are shown and not the medium size due to the limited display area. Also, the full screen graphics are not used in this example since there is no convenient way for the user to interact. In this way, the wearable device is treated as only a presenter of information, and the user is expected to have a second device such as a tablet for control capabilities or more information.

FIG. 48 shows a visual indicator of how old data is. Left: the widget at an early time after the data reading of 146 L/S was acquired, the far right shows the widget after a long time has elapsed indicating that the reading might be out of date. Time elapsed graphic is added to the widget, in this example, as a circle in the upper right with a growing angular region that increases clock-wise with a color indication of age of data. It is sometimes important for the user to know how "old" the data is, i.e. the time since its measurement. The rate that this example graphic changes would depend on the application, for data that changes frequently this indicator would change quickly, such as over a few seconds. Other time and age indicators could be used such as digital clock displays.

Screen Capture

In some cases, the web-browser MDAs invention is not convenient to use, and it is better to simply take graphics from a central computer's display and present it with augmented reality over markers attached to relevant objects. Two sample scenarios are given where information is in a central computer, and already graphically displayed on a computer screen in some location, but not displayed at the site where this information is desired.

The first example is an industrial facility where sensors and controls are wired up with a 'SCADA' (Supervisory Control and Data Acquisition) system. This SCADA information, such as motor speeds, pipe pressures, tank level are typically displayed on a computer in a control room but not displayed actually at the physical site of the motor, pipe, or tank in the plant. While it is possible to intercept or interface to this SCADA system, to connect to the SCADA communications system is often not desired for reasons such as the knowledge to do this was with the original plant designers and not the current operators, fear of disturbing a working system, and often the commercial provider of the SCADA system does not even provide access to make this possible.

The second example is of security cameras in a building, one can view all the imagery from these cameras from the main security central room, but often a security guard on foot within the building may wish to see this imagery, such as wondering what is behind a door. The guard may only wish to see a sub-section of one of the monitors in the control room to see what is currently seen by that camera.

In both these examples the desired imagery is already displayed in visual form, and if part of the imagery on a computer screen, in whole or in part of one screen, could be easily transmitted to the remote worker's mobile device, the worker could achieve more efficiency and safety in their work. A system that captured this imagery would still typically require that the mobile user select the specific imagery they desire, such as the sub-section of a computer screen, thus forcing the worker to interact with their device to navigate menus or lists to find this content. With this disclosed invention, each site of interest has a different fiducial marker attached to it, such as to each pump, pipe, motor, tank, etc or to doors or locations on the other side of a door from a video camera of interest. The user aims their mobile device at the marker and it selects and retrieves the information of interest instantly without any needed interaction by the user.

In both these examples, the mobile device could be a smartphone or tablet where the imagery is drawn on top of the video or still image in positions which are a function of the image location of the fiducial markers in such a way to improve the visual quality of the view. This function would take the position in the display image of all detected fiducial markers as input and would output the location of the widget centers. A line or arrow or some indication may connect the marker location to the widget so that if the widget is not directly close to the fiducial the user would be able to see what fiducial the widget belongs to. Below are three possible elements of this function, the function may perform one, two, or three of these:

a) a low pass smoothing function or kalman filter, DESP (Double Exponential), or similar which reduces the shaking and jittering of the widgets as that the image location of the fiducials may shake due to image noise and instability of the user's hand;

b) adaption to prevent widgets from overlapping, they would push each other out of the way, such as bubbles bumping against each other; and c) adaptation to prevent widgets from not been fully seen because they extend beyond the display borders, such as if the fiducial markers are close to the border and the widgets are larger than the fiducials in the display image. In this case the widget's position would be adjusted inwards so it can be viewed in its entirety.

Figure 52:
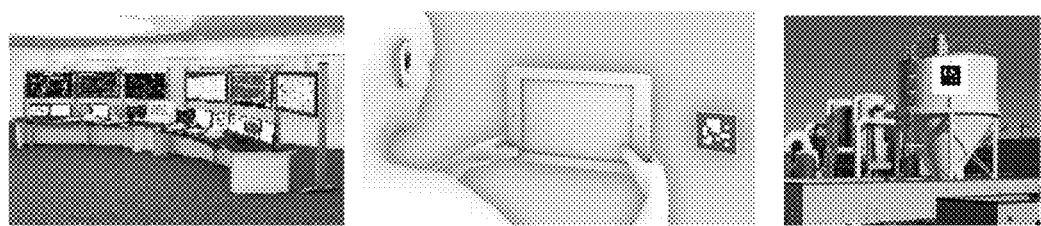
FIG. 52 shows the information from a computer screen in the main control room in the left figure, which is often desired on mobile devices (middle figure) when out at the facility (outside image right figure).

FIG. 52 shows the information from a computer screen in the main control room in the left figure, which is often desired on mobile devices (middle figure) when out at the facility (outside image right figure). A marker is affixed to the relevant object and it is desired for the user to access the relevant bit of information from the control screen.

Figure 53:
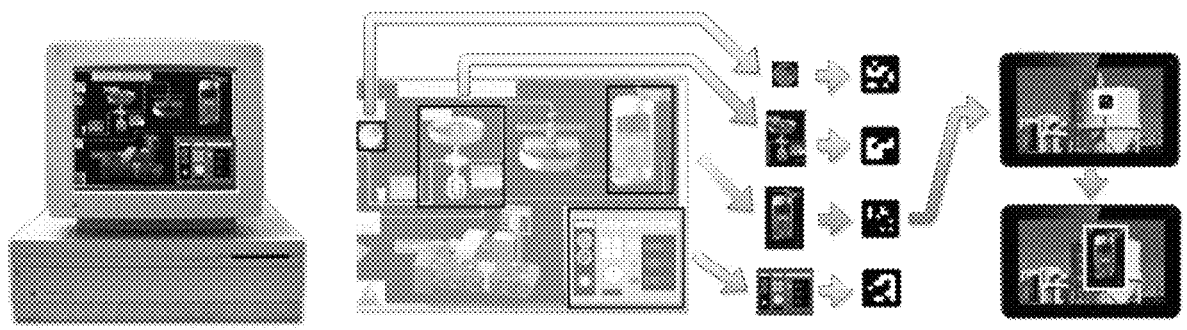
FIG. 53 shows how information from a distant computer is accessible when using a mobile device, without needing to interface to the industrial communication system.

FIG. 53 shows how information from a distant computer is accessible when using a mobile device, without needing to interface to the industrial communication system. The desired information is already in graphical format and a section of the distant computer screen is shown on the mobile device when aiming the mobile device at the object of interest. This invention uses a program running on the distant computer to periodically capture pre-configured sub-sections of the computer screen, with each one associated with a distinct marker. When the image sensor on the mobile device (tablet shown in far right) detects the marker, it displays the most recent corresponding sub-section. The lower right image shows what is seen on the screen of a mobile tablet device.

Collaboration

Figure 49:
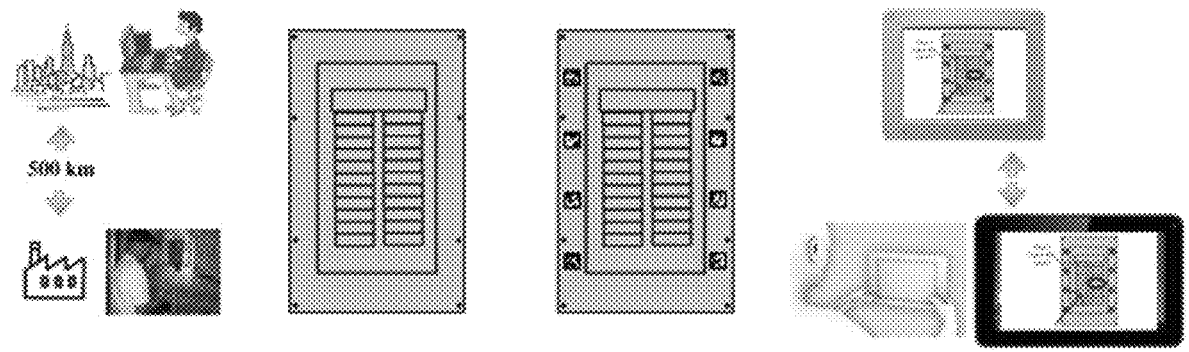
FIG. 49 shows a diagram of remote collaboration using MDAs.

A similar MDAs based aspect of the present invention is the use of markers for remote collaboration as depicted in FIG. 49. Sending maintenance workers out to a site is an inefficient process costing a lot of travel money and time for workers and businesses. This discloses an invention based on the marker detection algorithms that allows two people to work remotely on a single site. A typical application example is an expert on a standard computer back at some main office guiding a local worker on a remote mine site perform testing and maintenance on a piece of equipment such as a fuse panel. Simple audio descriptions and explanations over a conventional phone often don't suffice and the expert is forced to travel out to the site. The present invention discloses a method by which fiducial markers are placed around the site of interest and used to provide a graphical overlay visible to both parties. Both parties can draw graphics such as arrows, text, lines and circles to identify and guide the other. The local worker sees the graphics over their field of view such that they line up with the object as seen by the remote worker. Fiducial markers are used to align the overlay view seen by the local worker in the screen of their mobile hand-held or wearable device.

Following the fuse panel example, the local worker has a mobile device connected over a network to the remote expert back in the main city who is working on their conventional computer. The two workers are connected by a live audio connection as well, using both this verbal communication and the graphical overlay the local worker is guided by the remote expert to complete the task. The local worker sees overlay graphics in their live video view on their mobile device, where the overlay graphics is added on top of live video input from an outward facing image sensor. The remote expert sees a still image with the graphics overlaid on their computer. The image view seen by the remote expert is updated by an action by either party or occurs automatically with a timer. The remote expert uses their mouse or touch screen to select a colour of virtual paint and draws arrows and text over the image. The local worker can also draw their own overlay graphics to ask questions such as "do you mean this fuse?". The graphics drawn by either worker can be visually distinguished from one another and each side can erase their drawings. The markers are either attached temporarily by the local workers, such as temporary stickers, or are permanent markers attached to the fuse panel. If this is the first time the system has seen the marker arrangement, the system must learn the marker locations, either from a single image or by the local worker moving the mobile device around to different viewpoints. After the learning process is complete the software on the mobile device can align a 3-dimensional or 2-dimensional transform between the coordinate system of the mobile display screen and a coordinate system on the fuse panel.

FIG. 49 shows a diagram of remote collaboration using MDAs. An expert back in a main office (top left) communicates with a local worker in a remote factory (bottom left) to diagnose and fix a fuse panel (second from left). The local worker puts marker stickers on the fuse panel (middle) allowing the mobile device, a tablet in this example, to align overlay graphics of arrows, drawings, and text over top of the video image of the fuse panel. The graphical instructions appear lined up with the real fuse box.

It will be appreciated by one skilled in the art that variants can exist in the above-described layouts, uses, applications and methods. The scope of the claims should not be limited by the preferred embodiments set forth in the examples, but should be given the broadest interpretation consistent with the description as a whole.

REFERENCES

U.S. Pat. No. 7,769,236 B2 Marker and Method for Detecting Said Marker;
US Patent No. US 20140168262 A1 User Interface for Augmented Reality Enabled Devices;
U.S. Pat. No. 8,645,220 B2 Method and system for creating an augmented reality experience in connection with a stored value token;
US Patent No. US 20130135344 A1 Method and apparatus for web-based augmented reality application viewer;
Martin A. Fischler and Robert C. Bolles (June 1981). "Random Sample Consensus: A Paradigm for Model Fitting with Applications to Image Analysis and Automated Cartography" (PDF). Comm. of the ACM 24(6): 381-395;
H. Kato, Mark Billinghurst, Marker Tracking and HMD Calibration for a Video-based Augmented Reality Conferencing System. Proceedings of the 2nd International Workshop on Augmented Reality (IWAR 99). San Francisco, USA, October 1999;
Hybrid Indoor Location Estimation System Using Image Processing and WiFi Strength, Hattori, K.; Kimura, R.; Nakajima, N.; Fujii, T.; Kado, Y.; Bing Zhang; Hazugawa, T.; Takadama, K. Wireless Networks and Information Systems, 2009. WNIS '09. International Conference on Digital Object Identifier: 10.1109/WNIS.2009.92 Publication Year: 2009, Page(s): 406-411;
Improved Topological Fiducial Tracking in the reacTIVision System, Bencina, R.; Kaltenbrunner, M.; Jorda, S. Computer Vision and Pattern Recognition—Workshops, 2005. CVPR Workshops. IEEE Computer Society Conference on, Digital Object Identifier: 10.1109/CVPR.2005.475 Publication Year: 2005, Page(s): 99;
Alessandro Mulloni, Daniel Wagner, Istvan Barakonyi, and Dieter Schmalstieg. Indoor positioning and navigation with camera phones. IEEE Pervasive Computing, 8:22-31, 2009;
G. Schweighofer and A. Pinz, Robust pose estimation from a planar target. IEEE Transactions on Pattern Analysis and Machine Intelligence (T-PAMI), 28(12):2024-2030, 2006;
K. Mania. Perceptual sensitivity to head tracking latency in virtual environments with varying degrees of scene complexity. In Proceedings of the 1st Symposium on Applied perception in graphics and visualization, pages 39-47, Los Angeles, USA, 2004;
Mark Fiala Designing Highly Reliable Fiducial Markers PAMI journal (IEEE Transactions on Pattern Analysis Intelligence), vol. 32, no. 7, July 2010, pg. 1317-1324;
Mark Fiala, Anup Basu Robot Navigation Using Panoramic Tracking. Pattern Recognition 37(11) 2004 Pages 2195-2215;
Mark Fiala, Pano-Presence for Teleoperation. IROS 2005 (Proc. IEEE/RSJ Intl. Conf. on Intelligent Robots and Systems) Pages 2170-2174, August 2005;
Mark Fiala, Immersive Panoramic Imagery. CRV 2005 (2nd Canadian Conference on Computer and Robot Vision), May 2005.

I claim:

1. A method for detecting a marker in an image, comprising the steps of:
   detecting a marker in one or more previous frames of the image;
   using an edge detector to detect an edge in a current frame of said image;
   tracking line segment edges of the marker detected in the previous frame to find a new set of line segments;
   grouping the new set of line segments to provide a new set of polygons having salient points;
   calculating homography from polygon salient points;
   generating a list of homographies;
   extracting binary data from input image having homographies;
   verifying if the image is a marker by performing check sum and error correction functions; and
   if the image is a marker, identify as a marker and verify binary data;
   wherein the image is a consecutive image sequence.

2. The method of claim 1, wherein the step of tracking line segment edges further comprises:
   tracking by searching for matching step edges along a set of search lines perpendicular to the line segments, with several search lines spaced along each line segment, out to a length determined by an estimate of motion between frames;
   finding several candidate edgel points along each search line that correspond to a new true marker line segment edge;
   creating a set of possible new line segments from the several candidate edgel points from all search lines from the line segments; and grouping the new set of line segments and the set of possible new line segments to provide a new set of polygons having salient points.

3. The method of claim 2, wherein the set of possible new line segments created from the set of candidate edgel points are created using a RANSAC (Random Consensus) approach, wherein subsets of the set of candidate edgel points are chosen to define a test line, to which a distance to remaining edgel points are measured to determine how many edgels support the test line, where the number of supporting edgels is used to determine if the test line is a valid line to output from the tracking step.

4. The method of claim 3, wherein the candidate edgel points are found along the search line by using an edge detector filter, such as the Sobel edge detector, with a positive or negative threshold which must be exceeded to declare a candidate "edgel" point.

5. The method of claim 3, wherein the candidate edgel points are found along the search line by performing an image correlation operation between a section of the previous frame of the image and patches of pixels along this search line, where the correlation output is thresholded to declare a candidate "edgel" point.

6. The method of claim 1, wherein the line segment edges are from non-marker objects in the previous frame as well as from the sides of markers.

7. The method of claim 1, further comprising the step of providing an update containing a verification of the presence of position of all markers within each image frame of the image.

8. A system for measuring orientation, comprising:
markers mounted on a sphere that is constrained in position but able to rotate;
one or more image sensors aimed at said sphere and configured to detect said markers and measure a rotation position of the sphere without physical contact; and
an output for outputting the rotation;
wherein the rotation is calculated and expressed in a mathematical form such as a rotation matrix, Euler angles, or in quaternion form.

9. A system comprising:
various types of media content such as manuals, pictures of interior contents, maintenance information, notes, audio recording notes, video tutorials, PDF documents, warranty and reordering information;
markers on the media content;
wherein the markers are detected in an environment and detection of the markers comprises:
detecting a marker in one or more previous frames of the image;
using an edge detector to detect an edge in a current frame of said image;
tracking line segment edges of the marker detected in the previous frame to find a new set of line segments;
grouping the new set of line segments to provide a new set of polygons having salient points;
calculating homography from polygon salient points;
generating a list of homographies;
extracting binary data from input image having homographies;
verifying if the image is a marker by performing checksum and error correction functions; and
if the image is a marker, identify as a marker and verify binary data;
wherein the image is a consecutive image sequence.

10. The system of claim 9, wherein the tracking line segment edges in the detection of the markers further comprises:
tracking by searching for matching step edges along a set of search lines perpendicular to the line segments, with several search lines spaced along each line segment, out to a length determined by an estimate of motion between frames;
finding several candidate edgel points along each search line that correspond to a new true marker line segment edge;
creating a set of possible new line segments from the several candidate edgel points from all search lines from the line segments; and
grouping the new set of line segments and the set of possible new line segments to provide a new set of polygons having salient points.

11. The system of claim 10, wherein the set of possible new line segments created from the set of candidate edgel points are created using a RANSAC (Random Consensus) approach, wherein subsets of the set of candidate edgel points are chosen to define a test line, to which a distance to remaining edgel points are measured to determine how many edgels support the test line, where the number of supporting edgels is used to determine if the test line is a valid line to output from the tracking step.

12. The system of claim 9, further comprising means for automatically recording a relative position of each of the media content to enable a search for a specific item.

13. The system of claim 12, further comprising direction means for providing instructions such as arrow graphics to a user to guide them to a marker ID associated with the specific item.

14. A system comprising:
various types of media content such as manuals, pictures of interior contents, maintenance information, notes, audio recording notes, video tutorials, PDF documents, warranty and reordering information;
markers on the media content;
a smart camera for automatically recording a relative position of each of the markers to enable a search for a specific item; and
a graphic display for providing instructions such as arrow graphics to a user to guide them to a marker ID associated with the specific item;
wherein the markers are detected in an environment.

15. The system of claim 14, wherein detection of the markers comprises:
detecting an image to be evaluated using an image sensor;
using an edge detector to detect an edge in said image;
grouping more than one edge into a polygon having salient points;
calculating homography from polygon salient points;
generating a list of homographies;
extracting binary data from input image having homographies;
verifying if the image is a marker by performing checksum and error correction functions in all possible rotation positions; and
if the image is marker, identify it as a marker and verify binary data.

16. The system of claim 14, wherein data associated with the markers and the media content is provided by a server and also accessible from conventional web browsers.

17. The system of claim 16, wherein the media content and relative position is stored and shared by a server.

\* \* \* \* \*